(12) United States Patent
Wilson et al.

(10) Patent No.: US 10,976,816 B2
(45) Date of Patent: Apr. 13, 2021

(54) USING EYE TRACKING TO HIDE VIRTUAL REALITY SCENE CHANGES IN PLAIN SIGHT

(71) Applicant: MICROSOFT TECHNOLOGY LICENSING, LLC, Redmond, WA (US)

(72) Inventors: Andrew D. Wilson, Seattle, WA (US); Sebastian Lennard Marwecki, Potsdam (DE); Eyal Ofek, Redmond, WA (US); Christian Holz, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/451,132

(22) Filed: Jun. 25, 2019

(65) Prior Publication Data
US 2020/0409455 A1 Dec. 31, 2020

(51) Int. Cl.
*G06F 3/01* (2006.01)
*G06T 19/20* (2011.01)

(52) U.S. Cl.
CPC .............. *G06F 3/013* (2013.01); *G06T 19/20* (2013.01); *G06T 2219/2016* (2013.01)

(58) Field of Classification Search
CPC .. G06F 3/013; G06T 19/20; G06T 2219/2016
See application file for complete search history.

(56) References Cited

U.S. PATENT DOCUMENTS

| 2015/0338915 | A1* | 11/2015 | Publicover | H04W 12/0605 |
| | | | | 345/633 |
| 2016/0120403 | A1* | 5/2016 | Mochizuki | A61B 3/0025 |
| | | | | 351/209 |
| 2018/0033405 | A1 | 2/2018 | Tall et al. | |
| 2019/0005735 | A1 | 1/2019 | Rönngren | |

FOREIGN PATENT DOCUMENTS

| WO | 2017031089 A1 | 2/2017 |
| WO | 2018022523 A1 | 2/2018 |

OTHER PUBLICATIONS

"Infinite Pac-Man. Cognitive Science and More", Retrieved from: http://www.cogsci.nl/illusions/infinite-pac-man, Mar. 12, 2013, 3 Pages.

(Continued)

*Primary Examiner* — Andrew Sasinowski
(74) *Attorney, Agent, or Firm* — Shook, Hardy & Bacon, L.L.P.

(57) ABSTRACT

Various embodiments are provided herein for modifying a virtual scene based on eye-tracking. A computing device coupled to a HMD can provide a virtual scene for display on the HMD. The computing device can receive sensor data from a set of eye-tracking sensors coupled to the HMD. Based on the received sensor data, the computing device can determine a set of focal regions of the displayed virtual scene, including a perifoveal region of the displayed virtual scene. A portion of the virtual scene can then be modified based, in part, on a determination that the portion is outside of the determined perifoveal region.

20 Claims, 10 Drawing Sheets

(56) References Cited

OTHER PUBLICATIONS

"Order a Pizza with Your Mind and Eyes Using Pizza Hut Restaurant's Subconscious Menu by Tobii Eye Tracking", Retrieved from: https://www.tobii.com/group/news-media/press-releases/order-a-pizza-with-your-mind-and-eyes-using-pizza-hut-restaurants-subconscious-menu-by-tobii-eye-tracking/, Nov. 28, 2014, 2 Pages.

Anderson, et al., "Supporting Subtlety with Deceptive Devices and Illusory Interactions", In Proceedings of the 33rd Annual Conference on Human Factors in Computing Systems, Apr. 18, 2015, pp. 1489-1498.

Arlow, Jacob A., "Fantasy, Memory, and Reality Testing", In Journal of Psychoanalytic Quarterly, vol. 38, 1969-Issue 1, Nov. 29, 2017, 4 Pages.

Azmandian, et al., "Haptic Retargeting: Dynamic Repurposing of Passive Haptics for Enhanced Virtual Reality Experiences", in Proceedings of the Chi Conference on Human Factors in Computing Systems, May 07, 2016, pp. 1968-1979.

Baudisch, et al., "Focusing on the Essential: Considering Attention in Display Design", In Journal of the ACM, vol. 46, Issue 3, Mar. 1, 2003, 6 Pages.

Bender, Stuart., "Headset Attentional Synchrony: Tracking the Gaze of Viewers Watching Narrative Virtual Reality", in Journal of Media Practice and Education, Jan. 16, 2018, 21 Pages.

Bochynska, et al., "Tracking Down the Path of Memory: Eye Scanpaths Facilitate Retrieval of Visuospatial Information", In Journal of Cognitive Processing, vol. 16, Issue 1, Aug. 11, 2015, pp. 159-163.

Nright, Timothy J., et al., "Pupillary Response Predicts Multiple Object Tracking Load, Error Rate, and conscientiousness but not Inattentional Blindness", in Journal of Acta Psychologica vol. 144, Issue 1, Sep. 1, 2013, 39 Pages.

Bruce, et al., "Saliency, Attention, and Visual Search: An Information Theoretic Approach", In Journal of Vision, vol. 9, Issue 3, Mar. 1, 2009, 5 Pages.

Bruyer, et al., "Combining Speed and Accuracy in Cognitive Psychology: is the Inverse Efficiency Score (IES) a Better Dependent Variable than the Mean Reaction Time (RT) and the Percentage of Errors (PE)?", In Journal of Psychologica Belgica, vol. 51, Issue 1, Jan. 1, 2011, pp. 5-13.

Carrasco, Marisa., "Visual Attention: The Past 25 Years", In Journal of Vision Research, vol. 51, Issue 13, Apr. 28, 2011, pp. 1484-1525.

Carter, et al., "The Emergence of EyePlay: A Survey of Eye Interaction in Games", In Proceedings of the Annual Symposium on Computer-Human Interaction in Play, Oct. 16, 2016, 15 Pages.

Carter, et al., "Varying Rendering Fidelity by Exploiting Human Change Blindness", In Proceedings of the 1st Interational Conference on Computer Graphics and Interactive Techniques in Australasia and South East Asia, Feb. 11, 2003, pp. 39-46.

Causse, et al., "Encoding Decisions and Expertise in the Operator's Eyes: Using eye-Tracking as Input for System Adaptation", In International Journal of Human-Computer Studies vol. 123, Issue 125, May 1, 2019, pp. 55-65.

Chen, et al., "Computational Cognitive Models of Spatial Memory in Navigation Space", In Journal of Neural Networks, vol. 65, May 1, 2015, pp. 18-43.

Cheng, et al., "Sparse Haptic Proxy: Touch Feedback in Virtual Environments Using a General Passive Prop", In Proceedings of the CHI Conference on Human Factors in Computing Systems, May 6, 2017, 11 Pages.

Cheng, et al., "VRoamer: Generating On-The-Fly VR Experiences While Walking inside Large, Unknown Real-World Building Environments", Retrieved from: https://www.christianholz.net/2019-vr19-cheng_ofek_holz_wilson-VRoamer-Generating_On-The-Fly_VR_Experiences_While_Walking_inside_Large_Unknown_Real-Norld_Building_Environments.pdf, Mar. 24, 2019, 8 Pages.

Dementyev, et al., "Dualblink: A Wearable Device to Continuously Detect, Track, and Actuate Blinking for Alleviating Dry Eyes and Computer Vision Syndrome", in Proceedings of the ACM on Interactive, Mobile, Wearable and Ubiquitous Technologies, vol. 1, Issue 1, Mar. 30, 2017, 19 Pages.

Duchowski, T Andrew., "A Breadth-First Survey of Eye-Tracking Applications", In Journal of Behavior Research Methods, Instruments & Computers Voume 34, Issue 4, Jan. 1, 2002, pp. 455-470.

Duchowski, et aL, "The Index of Pupillary Activity: Measuring Cognitive load vis-à-vis Task Difficulty with Pupil Oscillation", In Proceedings of the CHI Conference on Human Factors in Computing Systems, Apr. 21, 2018, 13 Pages.

Elazary, et al., "Interesting Objects are Visually Salient", In Journal of Vision, vol. 8, Issue 3, Mar. 7, 2008, 15 Pages.

Gibaldi, et aL, "Evaluation of the Tobii EyeX Eye Tracking Controller and Matlab Toolkit for Research", In Journal of Behavior Research Methods, vol. 49, Issue 3, Jun. 1, 2017, pp. 923-946.

Guérard, et al., "The Processing of Spatial Information in Short-Term Memory: Insights from Eye Tracking the Path Length Effect", In Journal of Acta Psychologica, vol. 132, Issue 2, Oct. 1, 2009, pp. 136-144.

Clark, et al., "Clinical Methods: The History, Physical and Laboratory Examinations", In Journal of Jama, vol. 264, Issue 21, Dec. 5, 1990, pp. 2808-2809.

Hettiarachchi, et al., "Annexing Reality: Enabling Opportunistic Use of Everyday Objects as Tangible Proxies in Augmented Reality", In Proceedings of the CHI Conference on Human Factors in Computing Systems, May 7, 2016, pp. 1957-1967.

Insko, et al., "Passive Haptics Significantly Enhances Virtual Environments", in Doctoral Dissertation of University of Vorth Carolina, Apr. 1, 2001, 111 Pages.

Juola, et al., "Visual Search and Reading of Rapid Serial Presentations of Letter Strings, Words, and Text", In Journal of Experimental Psychology: General, vol. 111, Issue 2, Jan. 1, 1982, pp. 208-227.

Kang, et al., "Pupil Dilation Dynamics Track Attention to High-Level Information", In Journal of PLoS One, vol. 9, Issue 8, Aug. 27, 2014, 6 Pages.

Kishore, et al., "Comparison of SSVEP BCI and Eye Tracking for Controlling a Humanoid Robot in a Social Environment", In Journal of Teleoperators and Virtual Environments, vol. 23, Issue 3, Oct. 21, 2014, pp. 242-252.

Koch, et al., "Computational Modelling of Visual Attention", In Journal of Nature Reviews Neuroscience, vol. 2, Issue 3, Feb. 1, 2001, 11 Pages.

Kuhn, et al., "Don't be fooled Attentional Responses to Social Cues in a Face-to-Face and Video Magic Trick Reveals Greater Top-Down Control for Overt than Covert Attention", In Journal of Cognition, vol. 146, Jan. 1, 2016, 16 Pages.

Kulke, et al., "Neural Differences between Covert and Overt Attention Studied using EEG with Simultaneous Remote Eye Tracking", In Journal of Frontiers in Human Neuroscience, vol. 10, Nov. 23, 2016, 11 Pages.

Land, et al. "There's More to Magic than Meets the Eye", In Journal of Current Biology, vol. 16, Issue 22, Nov. 21, 2006, 2 pages.

Lanier, et al., "Model of Illusions and Virtual Reality", In Journal of Frontiers in Psychology, vol. 8, Jun. 30, 2017, 11 Pages.

Macknik, et al., "Magic and the Brain", In Journal of Scientific American, vol. 299, Issue 6, Dec. 1, 2008, 9 Pages.

Marshall, et al., "Deception and Magic in Collaborative Interaction", In Proceedings of the Conference on Human Factors in Computing Systems, Apr. 10, 2010, pp. 567-576.

Marwecki, et al., "Stenograph Fitting Real-Walking VR Experiences into Various Tracking Volumes", In Proceedings of the 31st Annual ACM Symposium on User Interface Software and Technology, Oct. 14, 2018, 10 Pages.

Palmer, Stephen E., "Vision science: Photons to Phenomenology", In Book of Photons to Phenomenology, Jan. 1, 1999, 4 Pages.

Peterson, et al., "Economic Valuation by the Method of Paired Comparison, with Emphasis on Evaluation of the Transitivity Axiom", In Journal of Land Economics, vol. 74, Issue 2, May 1, 1998, pp. 240-261.

Pfeuffer, et al., "Gaze + Pinch Interaction in Virtual Reality", In Proceedings of the 5th Symposium on Spatial User Interaction, Oct. 16, 2017, pp. 99-108.

(56) References Cited

OTHER PUBLICATIONS

Postle, Jostle, et al., "The Selective Disruption of Spatial Working Memory by Eye Movements", In Journal of Experimental Quarterly, vol. 59, Issue 1, Jan. 1, 2006, 21 Pages.
Regan, Kevin J., "Solving the "Real" Mysteries of Visual Perception the world as an Outside Memory", In Journal of Canadian Journal of Psychology Revue Canadienne de Psychologie, vol. 46, Issue 3, Oct. 1, 1992, 15 Pages.
Scholz, et al., "Covert Shifts of Attention Can Account for the Functional Role of "Eye Movements to Nothing"", In Journal of Memory & Cognition, vol. 46, Issue 2, Feb. 1, 2018, pp. 230-243.
Simeone, et al., "Substitutional Reality: Using the Physical Environment to Design Virtual Reality Experiences", In Proceedings of the 33rd Annual ACM Conference on Human Factors in Computing Systems, Apr. 18, 2015, pp. 3307-3316.
Simons, et al., "Change Blindness in the Absence of a Visual Disruption", in Journal of Perception, vol. 29, Issue 10, Oct. 1, 2000, pp. 1143-1154.
Simons, et al., "Gorillas in Our Midst: Sustained Inattentional Blindness for Dynamic Events", In Journal Perception vol. 28, Issue 9, Sep. 1, 1999, pp. 1059-1074.
Singh, et al., "Combining Planning with Gaze for Online Human Intention Recognition", In Proceedings of the 17th International Conference on Autonomous Agents and Multiagent Systems, Jul. 10, 2018, pp. 488-496.
Sra, et al., "VMotion: Designing a Seamless Walking Experience in VR", In Proceedings of the Designing Interactive Systems Conference, Jun. 9, 2018, 12 Pages.
Steenbergen, et al., "Pupil Dilation as an Index of Effort in Cognitive Control Tasks a Review", In Journal of Psychonomic Bulletin and Review vol. 25, Issue 6, Dec. 1, 2018, pp. 2005-2015.
Suma, et al., "Leveraging Change Blindness for Redirection in Virtual Environments", In Proceedings of the IEEE Virtual Reality Conference, May 25, 2011, 8 pages.
Sun, et al., "Toward Virtual Reality Infinite Walking: Dynamic Saccadic Redirection", In International Conference on Computer Graphics and Interactive Techniques, vol. 37, Issue 4, Jul. 30, 2018, 13 Pages.
Tognazzini, Bruce, "Principles, Techniques, and Ethics of Stage Magic and Their Application to Human Interface Design", In Proceedings of the Interact and CHI Conference on Human Factors in Computing Systems, May 1, 1993, pp. 355-362.
Tole, et al., "Visual Scanning Behavior and Pilot Workload", In Book of Visual Scanning Behavior and Pilot Workload, Jan. 1, 1981, 13 Pages.
Watson, et al., "A Unified Formula for Light-Adapted Pupil Size", In Journal of vision vol. 12, Issue 10, Sep. 25, 2012, 16 Pages.
Williams, et al., "Toward Everyday Gaze Input: Accuracy and Precision of Eye Tracking and Implications for Design", In Proceedings of the Chi Conference on Human Factors in Computing Systems, May 6, 2017, pp. 1118-1130.
Wilson, et al., "Autopager: Exploiting Change Blindness for Gaze-Aassisted Reading", In Proceedings of the Symposium on Eye Tracking Research and Applications, Jun. 14, 2018, 5 Pages.
Wolfe, Jeremy M. "Visual Search", In Journal of Current Biology vol. 20, Issue 8, Apr. 27, 2010, pp. 346-349.
Yamazaki, et al., "Sensing Visual Attention by Sequential Patterns", In Proceedings of the 22nd International conference on Pattern Recognition, Aug. 24, 2014, 6 Pages.

Zank, et al., "Eye Tracking for Locomotion Prediction in Redirected Walking", In Proceedings of the IEEE Symposium on 3D user Interfaces, Mar. 19, 2016, pp. 49-58.
"International Search Report and Written Opinion Issued in PCT Application No. PCT/US20/031549", dated Aug. 17, 2020, 12 Pages.
Davies, et al., "The Case of the Missed Icon: Change Blindness on Mobile Devices", in Proceedings of the Sigchi Conference on Human Factors in Computing Systems, May 5, 2012, pp. 1451-1460.
Dostal, et al., "Subtle Gaze-Dependent Techniques for Visualising Display Changes in Multi-Display Environments", n. Proceedings of the 2013 International Conference on Intelligent User Interfaces, Mar. 19, 2013, pp. 137-147.
Duchowski, et al., "Foveated Gaze-contingent Displays for Peripheral Lod Management, 3D Visualization, and Stereo Imaging", in Proceedings of Acm Transactions on Multimedia Computing, Communications, and Applications, vol. 3, Issue 4, Article No. 6, Dec., 2007, 18 pages.
Grad, et al., "Effective Use of the Periphery in Game Displays", in Proceedings of the 2007 Conference on Future lay, Nov. 15, 2007, pp. 69-76.
Ntille, Stephen S., "Change Blind Information Display for Ubiquitous Computing Environments", in International Conference on Ubiquitous Computing, Sep. 29, 2002, 16 Pages.
Jacob, Robert J.K., "The Use of Eye Movements in Human-computer Interaction Techniques: What You Look at is Nhat You Get", in Acm Transactions on Information Systems, vol. 9, Issue 3, Apr. 1, 1991, pp. 152-169.
<Umar, et al., "Gaze-Enhanced Scrolling Techniques", in Proceedings of the 20th Annual Acm Symposium on user nterface Software and Technology, Oct. 7, 2007, pp. 213-216.
Mancero, et al., "Looking but Not Seeing: Implications for Nci", in Proceedings of the 14th European Conference on 2,ognitive Ergonomics: Invent! explore!, Aug. 28, 2007, pp. 167-174.
Raifia, et al., "Gaze-Contingent Scrolling and Reading Patterns", in Proceedings of the 8th Nordic Conference on -luman-Computer Interaction: Fun, Fast, Foundational, Oct. 26, 2014, pp_ 65-68.
Rayner, et al., "Eye Movements in Reading: Models and Data", in Journal of Eye Movement Research, Apr. 3, 2009, 13 pages.
Santangelo, et al., "The Suppression of Reflexive Visual and Auditory Orienting when Attention is Otherwise Engaged", in Journal of Experimental Psychology: Human Perception and Performance, Feb., 2007, pp. 137-148.
Starker, et al., "A Gaze-Responsive Self-Disclosing Display", In Proceedings of the SIGCHI Conference on Human Factors in Computing Systems, Mar. 1, 1990, pp. 3-9.
Turner, et al., "Understanding Gaze and Scrolling Strategies in Text Consumption Tasks", In Adjunct Proceedings of the 2015 ACM International Joint Conference on Pervasive and Ubiquitous Computing and Proceedings of the 2015 ACM International Symposium on Wearable Computers, Sep. 7, 2015, pp. 829-838.
Vidal, et al., "Looking at or Through?: Using Eye Tracking to Infer Attention Location for Wearable Transparent Displays", In Proceedings of the 2014 ACM International Symposium on Wearable Computers, Sep. 13, 2014, pp. 87-90.
Simons, et al., "Change blindness", In Journal of Trends in Cognitive Sciences, vol. 1, Issue 7, Oct., 1997, pp. 261-267.

* cited by examiner

USING EYE TRACKING TO HIDE VIRTUAL REALITY SCENE CHANGES IN PLAIN SIGHT

BACKGROUND

Virtual reality technology employs specialized computing hardware and software to provide users immersive virtual environments to interact with and explore. Virtual reality technologies can place users into virtual, computer-generated environments, where they can perceive and interact with virtual objects rendered therein. An essential part of any media production is creating and arranging scenery, or staging, which is an important part of audience engagement and enjoyment.

In the context of interactive systems, such as virtual reality, unexpected staging is sometimes required as a virtual scene can react to user input, or user interaction with the virtual scene. Thus, creating or arranging virtual objects at runtime is needed in many virtual reality applications, as a virtual scene can change in many ways as a user interacts with the virtual environment.

SUMMARY

Embodiments described herein provide systems and techniques for dynamically modifying a virtual environment or scene. More specifically, a virtual scene can be provided to a head-mounted display (HMD) by a computing device coupled to the HMD, where the virtual scene is provided for display. The computing device can receive sensor data from a set of sensors, such as eye-tracking sensors coupled to the HMD. The sensors can generate sensor data that includes eye-tracking data, such as pupil location, pupilometry, and the like. Based on the eye-tracking data (e.g., location of the pupil relative to the displayed virtual scene), the computing device can determine a set of focal regions of the displayed virtual scene, such as a foveal region, a parafoveal region, and/or a perifoveal region, among other things. As one or more sets of focal regions are determined, the computing device can calculate probabilities, analyze timing, determine intent, or process other factors to determine whether and/or when to modify or change a portion of the virtual scene with an increased likelihood that a wearer or user of the HMD does not notice the modification or change.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
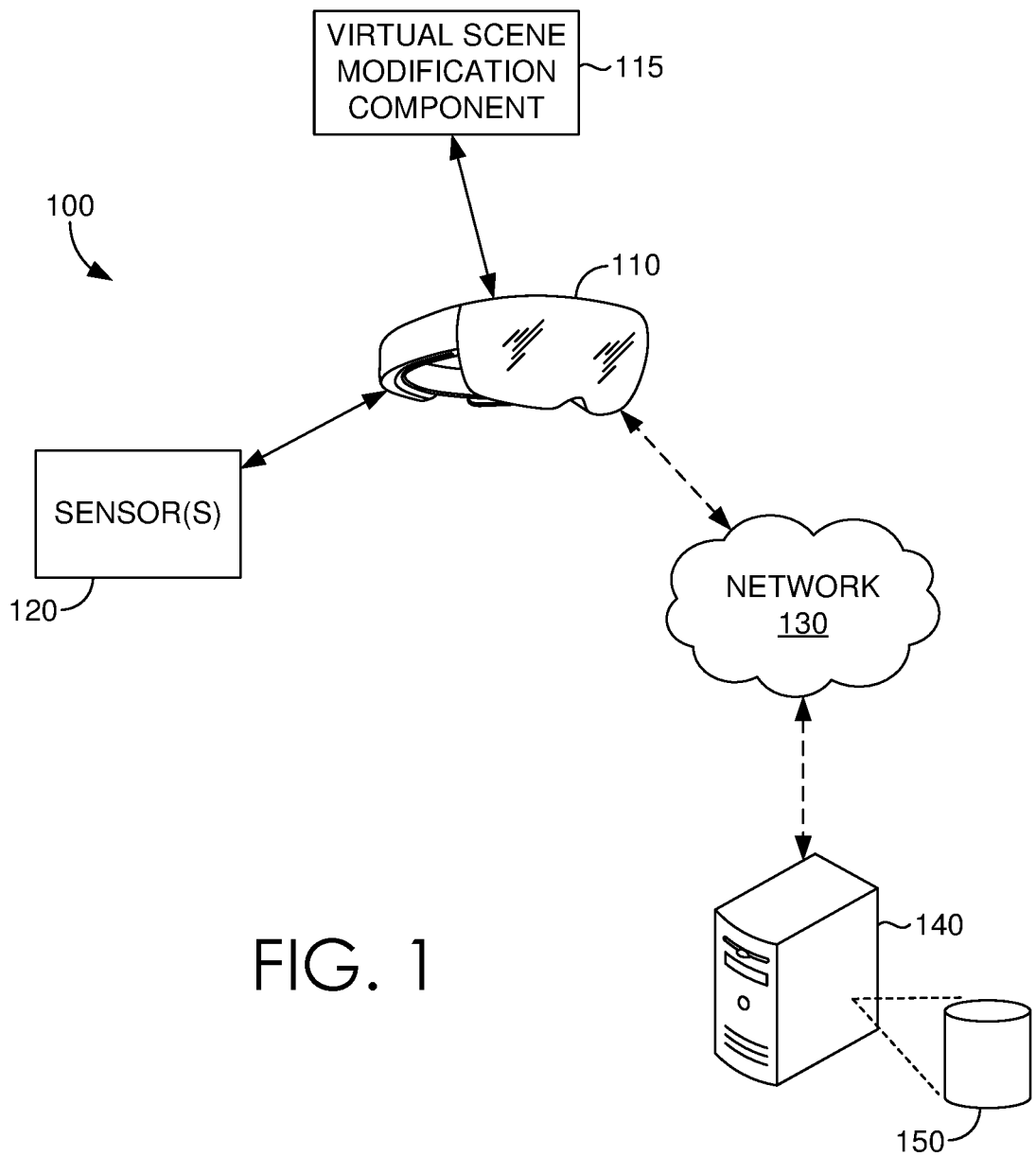
FIG. 1 is a block diagram of an exemplary operating environment for dynamically modifying a virtual environment, in accordance with some embodiments of the present disclosure.

Virtual reality (VR) is an immersive technology, where the user of the technology perceives a rendered virtual environment and virtual objects therein as if the perceived visual information was their present reality. While immersed in the virtual environment, typically while wearing a head-mounted display (HMD), the user can interact with the virtual environment.

In a media production, or in media content, creating and arranging a scene is an integral part of the overall experience. Such scene staging generally occurs before or as a production experience unfolds. While a movie or other content playback follows a linear flow having a predetermined timing of events (i.e. viewpoint is predetermined), in contrast, an interactive media (e.g., VR) may require unexpected, or ad-hoc staging, where user input is taken into account. In conventional VR systems, changes to a scene during staging are generally designed to be hidden from a user, for example they happen outside of a visible area. For example, they can happen behind an obstacle or obstacle or obstruction (e.g. a door), or simply occur outside of the field of view of a user. In virtual reality or augmented reality, dynamic staging can pose certain challenges. For example, a user may freely look around a virtual scene and might observe a change as it occurs, which can take away from a realistic user experience. Additionally, as the field of view of virtual reality and augmented reality headsets become larger, less space becomes available for dynamic staging. To address these drawbacks, and to create opportunities for dynamic staging in VR scenes, embodiments of the technology described herein provide for making modifications or changes to a virtual scene inside a user's field of view with little to no likelihood of observance. As a user might notice such a change in their field of view, and thus take away from a perceived consistency or realism of a scene, eye-tracking data may be leveraged to make a modification or change to a virtual scene within a user's field of view so that the modification or change is "hidden," or in other words, made covertly with a low likelihood of notice.

As such, embodiments of the present disclosure describe techniques for modifying or changing portions of a virtual scene by utilizing eye-tracking data. To this end, embodiments of the present disclosure can facilitate modifications or changes to a virtual scene, for example in unattended areas of a user's field of view, that are unnoticed by a user.

At a high level, embodiments of the present disclosure generally provide systems and methods for dynamically modifying a virtual environment or "scene" based on detected eye-tracking data. Accordingly, various embodiments of the technology disclosed herein track, measure, or otherwise capture data corresponding to a user's eyes that can be utilized to modify a virtual environment, for instance to covertly insert changes into a virtual scene. More specifically, a computing device coupled to a head-mounted display (HMD) receives sensor data from one or more sensors. Among other things, the sensors generate sensor data that includes eye-tracking data, for instance data corresponding to a user's point of gaze, the motion of an eye relative to a user's head, a pupil size, and/or reactivity of a user's eye, among other things. The eye-tracking data is employed by the computing device to determine if and/or when to modify one or more portions of a virtual scene that is currently displayed by the HMD, for example to hide changes inside a user's field of view but applying them outside a determined foveal region of the virtual scene, parafoveal region of the virtual scene, or perifoveal region of the virtual scene. As such, among other things, the computing device can apply covert changes to a virtual scene that can occur inside a user's field of view by processing eye-tracking data on two layers.

On a first layer, such as an attention layer, the computing device can determine when to change or modify a portion of a virtual scene. The computing device can process the generated eye-tracking data to determine a user's attention with respect to a potential modification to a portion of a virtual scene, i.e. the likelihood a user will notice the change or modification. In order to hide the change or modification, the computing device can determine the probability of detection corresponding to the change or modification. If the determined probability of detection falls below a pre-determined threshold the computing device can determine that the change or modification is ready to be made to the virtual scene.

On a second layer, such as an activation layer, the computing device can determine if the change or modification should be made. As such, in addition to ensuring that a user does not notice the change or modification, the computing device can determine that a user will not anticipate the change or modification. For example, restricting a change or modification soon after a user performs a specific action or a series of actions. In this way covert changes or modification to a virtual scene can be caused by covert triggers, either using random triggers or through derivation of user understanding and intention through the leveraging of eye-tracking data. In one instance the computing device can determine scan paths to define triggers. For example, the computing device can compare a generated gaze pattern of a user and compare it to a predefined gaze pattern corresponding to a particular displayed scene to determine user understanding and, in turn, determine if a change or modification should be made in a given virtual scene.

In some embodiments, the computing device can receive sensor data from a set of eye-tracking sensors coupled to a HMD as a user interacts with a virtual scene provided for display on the HMD coupled to the computing device. Based on the eye-tracking data, the computing device can determine a set of focal regions of the displayed virtual scene, for example the focal regions can include a foveal region, a parafoveal region, and/or a perifoveal region of a virtual scene displayed on an HMD. The virtual scene can then be modified by the computing device by determining that a portion of the virtual scene to be modified is outside the determined set of focal regions. In determining the focal regions, the computing device can process the generated eye-tracking data with a focus on a user's attention as they interact with a virtual scene. In processing the eye-tracking data, the computing device can base such processing on one or more high-level functions of a user's perception, for example attention and memory and causal inference. Based on the processing of the generated eye-tracking data, the computing device can derive a probability that a user will detect a modification or change in a virtual scene. One or more probabilities can be accumulated by the computing device and a single detection value can be derived to be utilized by the computing device as a detection rate to make a determination of when a change or modification can be made to a virtual scene perceived by a user.

In some embodiments, the computing device can cause changes or modifications to a virtual scene that is currently displayed by the HMD by utilizing gaze point to determine the current attention of a user. In some embodiments this is accomplished through determining focal regions of a displayed virtual scene based on eye-tracking data associated with a user. It will be appreciated that changes or modification to virtual objects that appear outside of a determined foveal, parafoveal, and/or perifoveal region of the displayed virtual scene are less likely to be detected, and as such gaze point can be leveraged to make changes or modification to the virtual scene. In this instance, the computing device can compute the convex hull of a virtual object's mesh data points with respect to the view plane. If the angular distance between the computed convex hull and the measured or determined gaze point (e.g. based on the set of focal regions) falls below a threshold value, the virtual object is considered by the computing device to be in the user's focus (e.g. the user is looking at the virtual object within the virtual scene). In certain embodiments, the minimum angular distance threshold can be set to 7 degrees, such that the threshold is above a 5 degree angle of a foveal region. In other embodiments, a higher angular distance can be used as a user's central vision can extend to 30 degrees.

In some embodiments, the computing device can cause changes or modifications to a virtual scene with that is displayed by the HMD, by utilizing and processing gaze dwell times on various objects in the virtual scene. In this way, for example, spatial memory can be considered with respect to a user's attention when changing or modifying a virtual scene, thus a user may be prevented from using visual recall to notice a change or modification of the virtual scene. The computing device can determine one or more different sets of focal regions of a displayed virtual scene based on different sensor data received from the set of eye-tracking sensors. The different sets of focal regions can include corresponding different foveal, parafoveal, and/or perifoveal regions of the displayed virtual scene. Further, the computing device can calculate a weight associated with various portions or virtual objects of the virtual scene, for instance a calculated weight can be based on determined time durations between the determined set of focal regions and the one or more different sets of focal regions. Based on the calculated weight a portion of the virtual scene can be modified or changed. In some embodiments, a weighted directed graph can be implemented by the computing device with nodes representing all relevant objects in a virtual scene and edges connecting the nodes. Weights can be determined for theses nodes that can for example represent an internalized allocentric spatial relation between pairs of nodes. In some instances the user can also be represented by a node, and the edges from the user node can represent the internalized egocentric spatial relation between the user and one or more virtual objects. The weights can be adjusted (i.e. incremented or decremented) based on determined sets of focal regions of the virtual scene. For example, the weights can increment when a user looks at a virtual object or at multiple virtual objects in a row, which in some instances can be order dependent. The weights can decrement when a user has not looked at a virtual object for a given time duration. When a change or modification to the virtual scene is to be made, the computing device can determine the probability of a user noticing the changed spatial configuration. For instance, the determined probability can be the maximum of the difference of all spatial relations before and after the change or modification that can further be normalized by a baseline distance and a baseline rotation. Thus, a user's attention is predicted by a violation to spatial memory; if the violation to spatial memory is too high the computing device can make changes or modifications to the virtual scene that are less relevant.

In some further embodiments, the computing device can cause changes or modifications to a virtual scene that is displayed by an HMD utilizing pupilometry as it relates to cognitive load. The computing device can determine a pupilometry based on, for example, a detected pupil diameter included in received sensor data from the set of eye-tracking sensors. From the pupilometry, a cognitive load value can be determined and the virtual scene can be changed or modified based on the cognitive load value. In some embodiments, an index of pupillary activity can be implemented as a measure of cognitive load. Accordingly, a pupil dilation's correlation with detection rate of changes to a virtual scene can be utilized to predict a user's attention. In some instances, pupil dilation can be measured over varying illumination levels of a viewing plane to determine a baseline. From on this baseline, an assumed pupil diameter can be derived over which fast wavelet transforms can be run to count local peaks of that value, which can be normalized.

In some further embodiments, the computing device can cause changes or modifications to a virtual scene that is currently displayed by an HMD utilizing saccades, for instance saccades may be used to approximate visual saliency. The computing device can determine a number of saccades over a defined period of time based on the received sensor data, and change or modify a virtual scene based on a determination that the number of saccades for a given time frame is below a threshold value. In some instances, modifications or changes to a virtual scene can be made at a time between a measured saccade and a given time after it, as this assumes a user would not focus on objects outside of the determined focal region during this time frame (i.e. covert attention of a user is not possible during the time duration after a measured saccade). In some other instances, covert attention can be prevented by implementing a task requiring a user's visual attention (e.g. reading).

In some further embodiments, the computing device can cause changes or modifications to a virtual scene that is displayed by an HMD by taking into account measured user intent and/or measured user understanding as they relate to a virtual scene. In one embodiment, user intent can be measured by capturing and thresholding dwell times on objects or sets of objects. The computing device can determine a time duration associated with a determined foveal region as compared to a different portion of a displayed virtual scene. The virtual scene can be changed or modified based on a comparison of the determined duration to a defined dwell threshold duration. In another embodiment, user understanding can be measured by using a probabilistic comparison of a user's gaze pattern to an intended gaze pattern associated with a virtual scene. Based on received sensor data the computing device can determine a plurality of different sets of focal regions of the displayed virtual scene, the plurality of different sets of focal regions defining a gaze pattern. The computing device can change or modify the virtual scene based on a determination that the defined gaze pattern corresponds to at least one predetermined or known gaze pattern.

In some further embodiments, the computing device can utilize additional masking techniques when changing or modifying a virtual scene, for example by modifying a virtual scene based on another modification to the virtual scene, such as the insertion of a virtual object into the virtual scene that is positioned at a distance away from the portion to be modified. Additionally, other modifications can be made to the virtual scene that is a threshold distance away from the portion to be modified, for example creating distractions, or reducing frame rates in portions of the virtual scene.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a head-mounted display (HMD) coupled to a set of sensors, such as HMD 110 and sensor(s) 120. The HMD 110 can include a stereoscopic display to facilitate a stereoscopic presentation of three-dimensional virtual environments and virtual objects that can be perceived by a user wearing the HMD 110. The HMD 110 can incorporate a virtual scene modification component 115, that can be integrated into the HMD, or stored separately, for example on a remote computing device or server device 140.

In various embodiments, the set of sensors can include tracking sensors 120 (e.g., eye-tracking sensors) that can generate sensor data employable by the virtual scene modification component 115, to make modifications or changes to a virtual scene that is currently displayed by HMD 110, more specifically to make modifications or changes to a virtual scene that is within a user's field of view. For example, the sensor data can be used to determine a user's point of gaze, the motion of an eye relative to a user's head, or pupil size, and/or reactivity of a user's eye.

In some embodiments, virtual scene data can be hosted by a remote server device, such as server device 140. The server device 140 can be accessed by HMD 110 via a network 130, which can include a LAN, WAN, PAN, or the Internet, by way of example. The server device 140 can be coupled to a database 150 that can store, among other things, one or more applications comprising virtual scene data that can be retrieved and provided for display on HMD 110.

Figure 2:
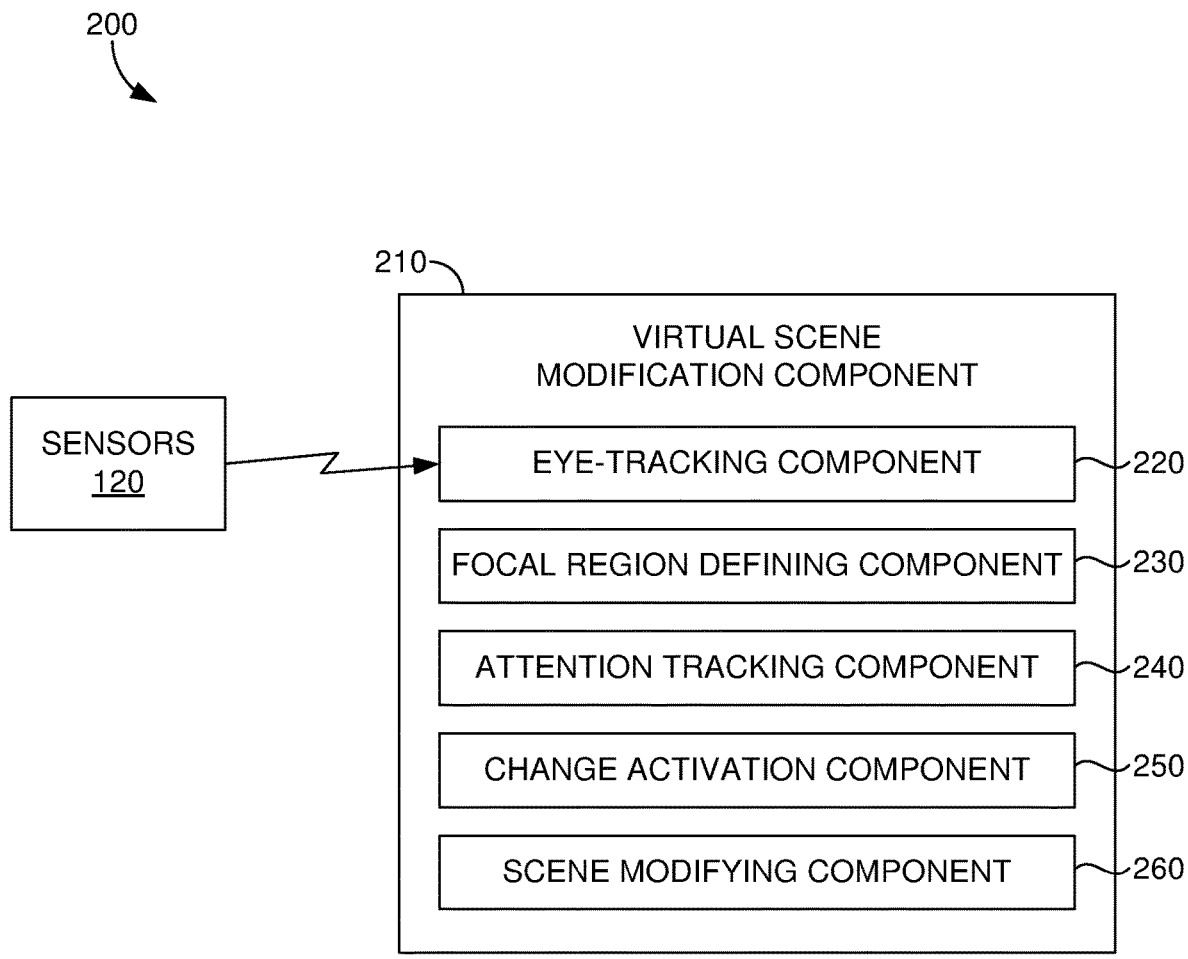
FIG. 2 is a block diagram of an exemplary reality scene modification device for dynamically modifying a virtual environment utilizing eye-tracking, in accordance with some embodiments of the present disclosure.

Turning now to FIG. 2, a block diagram 200 is provided, illustrating an exemplary virtual scene modification component 210, such as virtual scene modification component 115 of FIG. 1, for dynamically modifying or changing a virtual scene based on received sensor data, such as data received from sensors 120. A virtual scene modification component 210 provided in accordance with some described embodiments, in an example, can hide or covertly insert modifications or changes to a virtual scene that is displayed, or currently displayed, by an HMD (e.g. HMD 110 of FIG. 1), among other things. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The virtual scene modification component 210 is an example of a suitable architecture for implementing certain aspects of the present disclosure. It should be understood that any number of user devices, hardware, modules, or components within the scope of the present disclosure can be employed to perform the functions described in associated with the virtual scene modification component 210. As each of the described components are depicted as being included in the virtual scene modification component 210, it is contemplated that any component depicted therein is not limited to the illustrated embodiment, and can be distributed among a plurality of computing devices, modules, or hardware devices, or in some instances, may be conflated into a single hardware device or module, such as a processor or hardware device. It is also contemplated that any one or more of the described components can be completely removed from the virtual scene modification component 210, so long as one or more operations described in correspondence to a removed component can be compensated for by one or more other components, or a third-party resource, remote computing device, or hardware device, among other things.

The virtual scene modification component 210 can include an eye-tracking component 220 that receives sensor data from the sensor(s) 120, e.g. eye-tracking sensor(s). The eye-tracking component 220 can determine, among other things, a user's point of gaze, the motion of an eye relative to a user's head, or pupil size, and/or reactivity of a user's eye based on the received eye-tracking sensor data. The eye-tracking sensor data can include electronic information that corresponds to fixations, saccades, and/or reactivity of a user's eye and its movement, among other things.

The virtual scene modification component 210 can further include a focal region defining component 230. In various embodiments, the focal region defining component 230 can generate, or otherwise define, a set of focal regions of the displayed virtual scene based on the eye-tracking sensor data, for example provided by eye-tracking component 220. In some embodiments, the set of focal regions can include one or more of a foveal region, a parafoveal region, and/or a perifoveal region of a displayed virtual scene. As will be appreciated, these regions can correspond to how information, such as a scene, is processed by a user's eye.

The virtual scene modification component 210 can further include an attention tracking component 240. The attention tracking component 240 can determine that a portion of a virtual scene can be modified based on the determined set of focal regions (e.g. foveal region, a parafoveal region, and/or a perifoveal region of the displayed virtual scene). In some embodiments, attention tracking component 240 processes the determined set of focal regions to determine when to modify or change a virtual scene. As such, attention tracking component 240 can provide an estimation and/or a determination of a user's attention with respect to the portion of the virtual scene to be modified (i.e. the likelihood of a user noticing the change in the field of view). For example, an application generating the virtual scene, or another user, can suggest, request, or otherwise specify a modification or change (e.g. the movement or changing of one or more virtual objects) to be made to the virtual scene. The request can be sent to and/or received by the virtual scene modification component 220. Based on the set of focal regions or plurality of sets of focal regions, determined by the focal region defining component 230, the attention tracking component 240 can process the focal regions of the virtual scene and subsequently calculate or otherwise determine a probability that a user will detect the change. It will be appreciated that the attention tracking component 240, in essence, determines when a modification or change can be made to a portion of the virtual scene. For example, if a probability of detection is below a certain pre-defined threshold, the virtual scene modification component 210 is ready to modify or change the virtual scene. In some embodiments, attention tracking component 240 can determine that a portion of a virtual scene can be modified based on a relative position of the portion to be modified or changed as compared to one or more regions of the determined set of focal regions. In some other embodiments, attention tracking component 240 can determine that a portion of the virtual scene can be modified based on a weight calculated for the portion (e.g. based on a weight calculation derived from a weighted directed graph), a determined pupilometry (e.g. measured by eye-tracking component 220), a detected number of saccades, and/or a determined time duration after one or more saccades. Additionally, attention tracking component 240 can determine or otherwise calculate one or more attention values which each correspond to a probability of detection, which defines how likely or not a user will notice, or attend to, a modification or change to a portion of the virtual scene. Furthermore, attention tracking component 240 can determine whether a probably of detection falls below a pre-defined threshold, indicating the modification or change can be made to the virtual scene at that time.

The virtual scene modification component 220 can further include a change activation component 250. The change activating component 250 can determine that a portion of a virtual scene can be modified based on the determined set of focal regions (e.g. a foveal region, a parafoveal region, and/or a perifoveal region of the displayed virtual scene). In some embodiments, change activation component 250 processes the determined set of focal regions to determine if a modification or change can be made to a virtual scene. Whereas attention tracking component 240 can determine that a user is not likely to notice or attend to the modification or change, change activation component 250 can determine that a user is not likely to anticipate a change. According to aspects of the technology described herein, covert modifications or changes to a virtual scene can incorporate covert triggers. In some instances, the virtual scene modification component 210, and more particularly change activating component 250 can use random triggers to cause a modification or change to a virtual scene (e.g. cross-fading one or more virtual objects into, or out of, the virtual scene at random time intervals), or in some embodiments, user understanding and user intention with respect to one or more features (e.g. one or more virtual objects and their associated visual characteristics) of a virtual scene can be determined or otherwise derived by change activation component 250. In one example embodiment, one or more predefined scan paths, or gaze patterns can be associated with a virtual scene (e.g. stored on the HMD or in data store 150 of server 140). Based on the set of focal regions, or plurality of sets of focal regions, determined by focal region defining component 230, change activation component 250 can process the focal regions and determine one or more scan paths or gaze patterns for comparison to the one or more predefined scan paths or gaze patterns which can be used to determine if a modification or change to a portion of the virtual scene can occur. In another example, change activation component 250 can determine a user intent and/or interest with respect to one or more virtual objects of the virtual scene. For example, user intent with respect to a particular virtual object can be derived by determining that a foveal region of the determined set of focal regions corresponds to the particular virtual object. Additionally it can be determined (e.g. by change activation component 250) that the foveal region of the determined set of focal regions corresponds to the particular virtual object for a period of time that exceeds a threshold dwell time. In yet another example, change activation component 250 can determine a user understanding with respect to one or more virtual objects of the virtual scene. For example, user understanding with respect to a virtual scene can be derived by determining a plurality of different sets of focal regions (e.g. by focal region defining component 230) and subsequently defining (e.g. by change activation component 250) one or more gaze patterns or scan paths corresponding to the virtual scene. Change activation component 250 can probabilistically compare the one or more gaze patterns or scan paths to one or more known (e.g. predefined) gaze patterns or scan paths to determine, for example, a measure of user understanding with respect to the virtual scene. In some embodiments, change activation component 250 can generate the one or more gaze patterns or scan paths by implementing a weighted directed graph, where the weights of the nodes and edges are adjusted (incremented and/or decremented) based on a determination that a foveal region corresponds to a particular virtual object for a given amount of time and/or on a determination of a time duration between when a first set of focal regions is determined and when a second set of focal regions is determined.

The virtual scene modification component 220 can further include a scene modifying component 260. Scene modifying component 260 can receive input from, for example, attention tracking component 240 and/or change activation component 250 and cause a modification or change to one or more portions of a virtual scene. Scene modifying component 260 can additionally cause other changes to the virtual scene to further mask modifications or changes to the one or more portions of the virtual scene. For example, as described herein, changes or modifications can be made to a portions of a virtual scene in an unattended area of display (i.e. outside a user's fovea). In some embodiments, salient noise or other motion conditions can be injected into the virtual scene that can create distractions to mask a modification or change to a portion of the virtual scene. In some instances, gradual fades or low contrast may be utilized to further mask modifications or changes to portions of a virtual scene. In some other instances, attention can be prevented by implementing one or more tasks requiring a user's visual attention (e.g. reading, solving a problem etc.). Accordingly, scene modifying component 260 can distract a user or otherwise reduce the possibility that a user will detect a change or modification made to a portion of a virtual scene. FIGS. 3A-3C through FIGS. 8A-8B are now described in relation to some of the foregoing masking techniques.

Figure 3A:
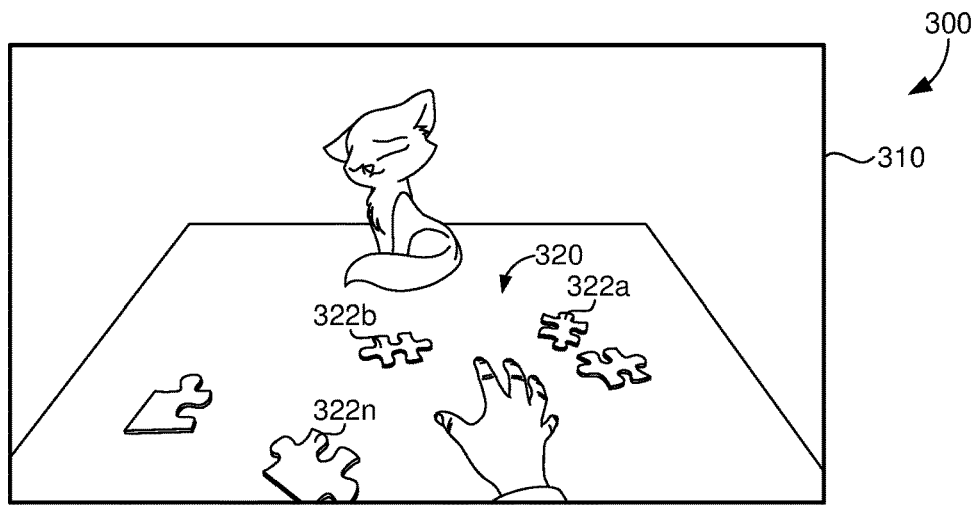
FIGS. 3A-3C depict a variety of illustrations showing exemplary implementations for dynamically modifying virtual environments utilizing eye-tracking, in accordance with some embodiments of the present disclosure.
Figure 3B:
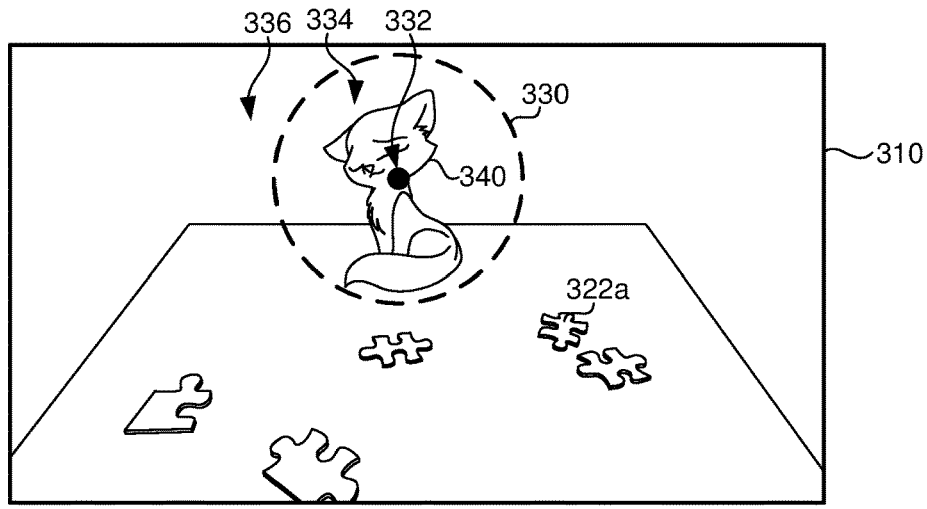
Figure 3C:
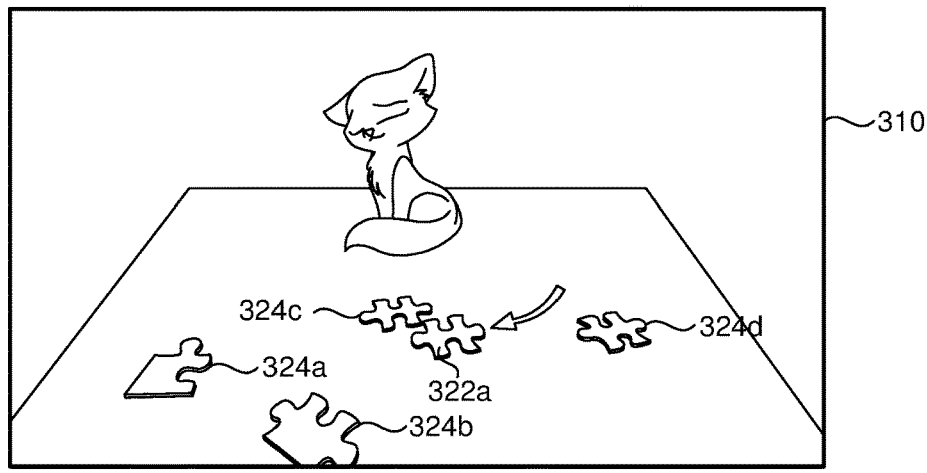

Looking now to FIGS. 3A-C, a set of illustrations 300 are provided to depict an exemplary implementation of modifying a virtual scene using eye-tracking data, in accordance with some embodiments of the present disclosure. A virtual scene 310 can be provided for display on an HMD (e.g. HMD 110 of FIG. 1) for a user to interact with. For example, a user can interact with the virtual scene 310 by being given a task 320 to complete, e.g. solving a puzzle. In some embodiments the virtual reality application generating the scene 310 can make the task 320 easier or more difficult by rearranging, inserting, or removing one or more virtual objects 322a, 322b, 322n in the virtual scene 310. As the user controls the field of view in a virtual environment, modifications or changes to the virtual scene 310 can be made covertly according to aspects of the technology described herein such that the user does not notice the modification or change within the field of view, for example a modification or change can be made inside the field of view but outside of a focal region. Based on sensor data received from a set of eye-tracking sensors (e.g. eye-tracking sensors 120 of FIG. 1) a set of focal regions 330 of the displayed virtual scene 310 can be determined, for example the set of focal regions 330 can include a foveal region 332, a parafoveal region 334, and/or a perifoveal region 336 of a displayed virtual scene 310. Generally, these regions can relate to various regions of a user's eye used to process an image (i.e. image information), for example with respect to visual acuity. Foveal region 332, for example can define a focal region corresponding to sharp, central image processing. Parafoveal region 334, for example, can define an intermediate focal region and can define a greater field of vision than foveal region 332. Perifoveal region 336, for example, can define an outer focal region and defines a greater field of vision than parafoveal region 334. As the regions become larger, it will be appreciated that the visual acuity of a user generally will decrease. It will be appreciated that these defined regions can vary in width or degree, and that there can also be additional or fewer defined regions.

The focal regions 330 can relatively correspond to a user's gaze, or in other words, correspond relatively to a location that the user is looking at (e.g., a virtual object 340) in the virtual scene 310. A portion of the virtual scene 310 can be modified or changed based the determined set of focal regions 330. For instance, a modification or change can be made with respect to another virtual object, e.g. virtual object 322a in the virtual scene 310 that is outside of the determined set of focal regions 330. Additionally, other changes to the virtual scene can be made in order to further mask the modification or change made with respect to the another virtual object. For example, salient noise or other motion conditions can be injected into the virtual scene that can create distractions to mask a modification or change to a portion of the virtual scene (e.g. causing virtual object 340 to move or become animated). In another example, a gradual fade may be utilized to further mask the modification or change made with respect to the another virtual object (e.g. virtual object 322a may be moved via a gradual fade). In yet another example, contrast adjustments (e.g. lowering the contrast) may be made to further mask the modification or change, for example lowering the contrast of some of the other virtual objects in the virtual scene (e.g. 324a-324d).

Figure 4A:
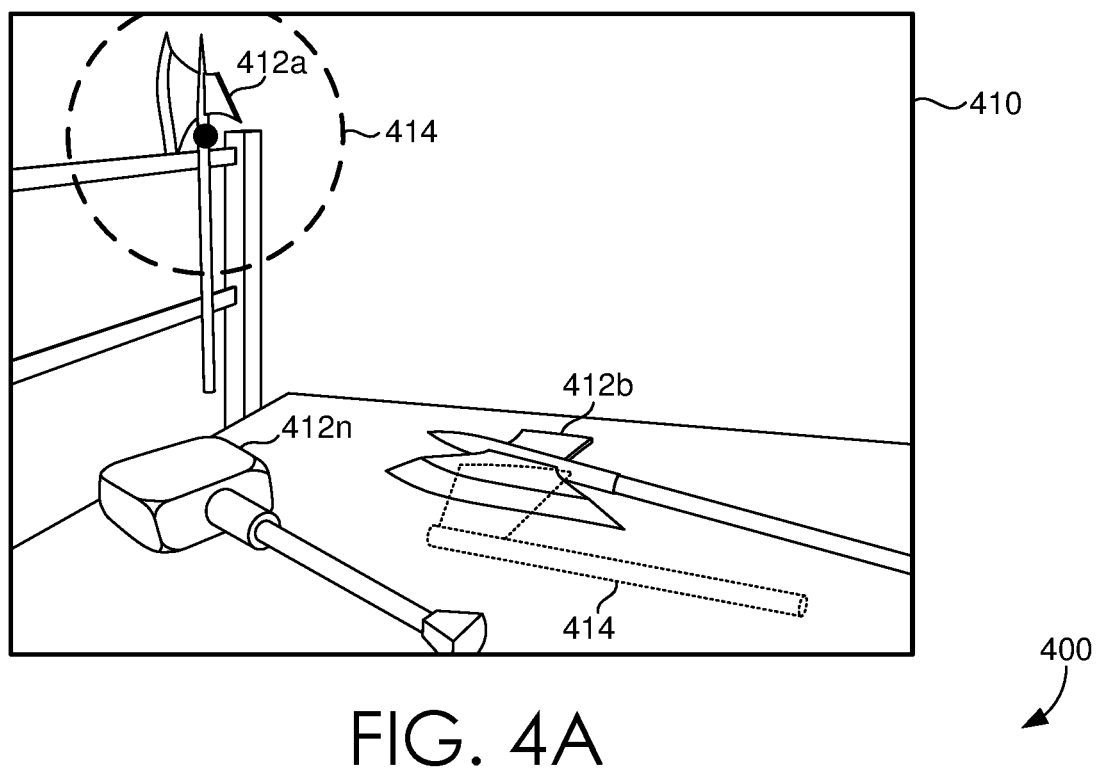
FIGS. 4A-4B depict a variety of illustrations showing further exemplary implementations for dynamically modifying virtual environments utilizing eye-tracking, in accordance with some embodiments of the present disclosure.
Figure 4B:
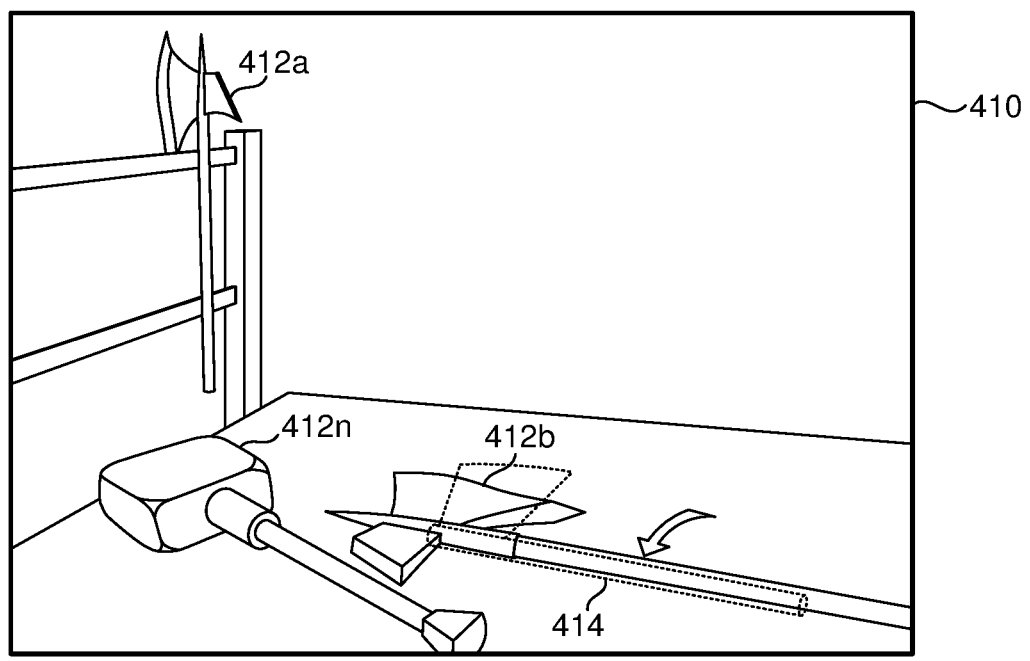

Looking now to FIGS. 4A-B, a set of illustrations 400 are provided to depict an exemplary implementation of modifying a virtual scene using eye-tracking data, in accordance with some embodiments of the present disclosure. A virtual scene 410 can be provided for display on an HMD (e.g. HMD 110 of FIG. 1) for a user to interact with. The virtual scene 410 can include any number of virtual objects 412a, 412b, 412n. In some embodiments, a user can interact with the virtual scene 410 via a haptic prop 414 that is located in the physical world. As the user is viewing the virtual scene 410, sensor data can be received from a set of eye-tracking sensors (e.g. sensors 120 of FIG. 1) and a set of focal regions 414 can be determined. In this exemplary implementation, the application generating the virtual scene 410 is enabled to allow the user to pick up a virtual object 412b, 412n utilizing the haptic prop 414. Based on the set of focal regions 414, it can be determined, for example, that the user is interested in the virtual object 412a being looked at. Accordingly, a portion of the virtual scene 410 can be modified or changed based on the determined focal regions 414, and further such that the modification or change occurs outside the set of focal regions 414. In this exemplary implementation, it can be determined that the user is interested in virtual object 412a, and accordingly, similar object 412b can be moved, matched, or otherwise mapped to a position and a rotation of the haptic prop 414. In some instances, other changes to the virtual scene can be made in order to further mask the modification or change. For example, a gradual fade may be utilized to further mask the modification or change made in the virtual scene with respect to moving, matching, or otherwise mapping similar object 412b (e.g. virtual objects 412b and 412n may be moved via a gradual fade).

Figure 5A:
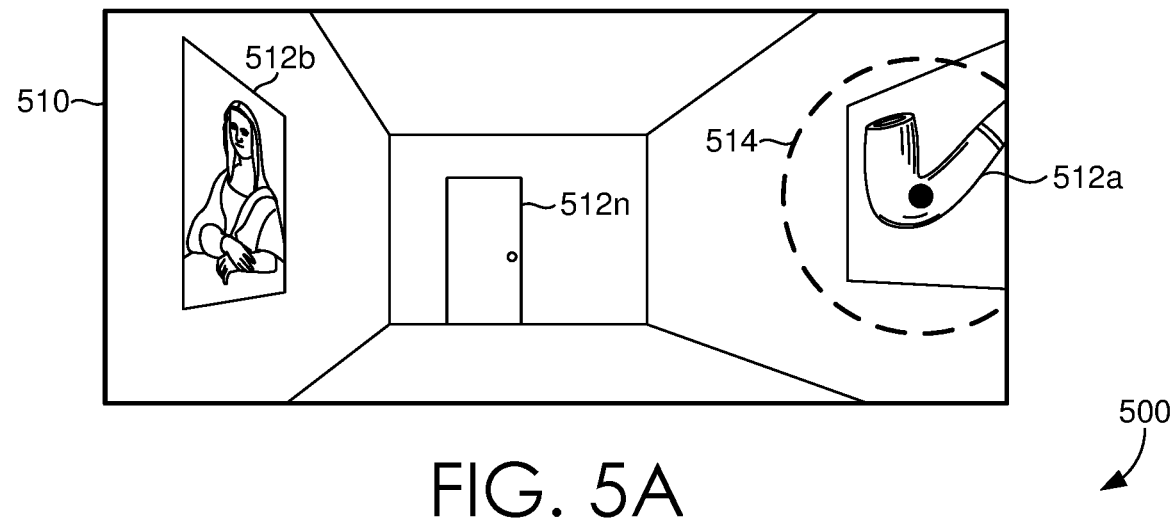
FIG. 5A-5B depict a variety of illustrations showing even further exemplary implementations for dynamically modifying virtual environments utilizing eye-tracking, in accordance with some embodiments of the present disclosure.
Figure 5B:
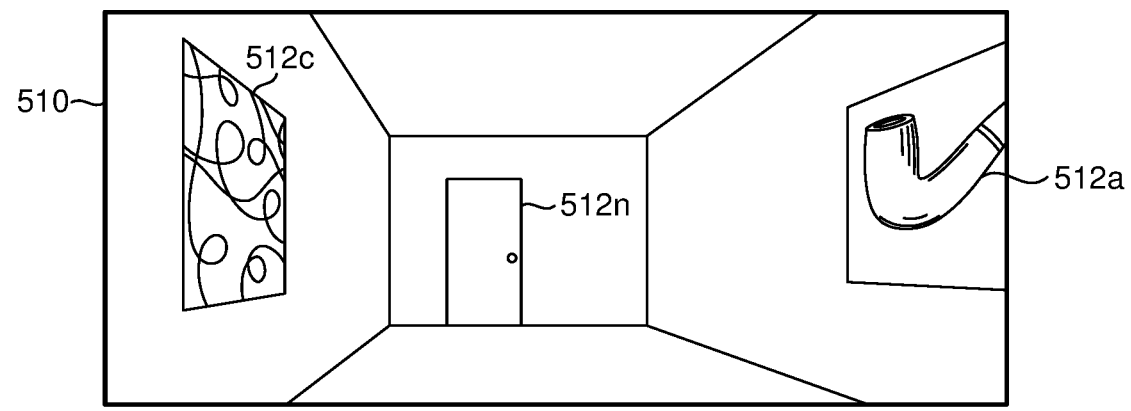

Looking now to FIGS. 5A-B, a set of illustrations 500 is provided to depict exemplary implementations of modifying a virtual scene using eye-tracking data, in accordance with some embodiments of the present disclosure. A virtual scene 510 can be provided for display on an HMD (e.g. HMD 110 of FIG. 1) for a user to interact with. The virtual scene 510 can include any number of virtual objects 512a, 512b, 512n. As a user interacts with virtual scene 510, e.g. the user walks through the virtual environment and/or views the virtual environment, sensor data can be received from a set of eye-tracking sensors (e.g. sensors 120 of FIG. 1) and a set of focal regions 514 can be determined. In this exemplary implementation, based on the set of focal regions 514, it can be determined, for example, that the user is interested in the virtual object 512a. Accordingly, a portion of the virtual scene 510 can be modified or changed based on the determined focal regions 514, for example to adapt to a user's interest, virtual object 512b can be changed, modified, or otherwise switched, e.g. to virtual object 512c. In some instances, other changes to the virtual scene can be made in order to further mask the modification or change. For example, a gradual fade may be utilized to further mask the modification or change made in the virtual scene (e.g. the change or modification made with respect to virtual objects 512b and 512c may be done via a gradual fade).

Figure 6A:
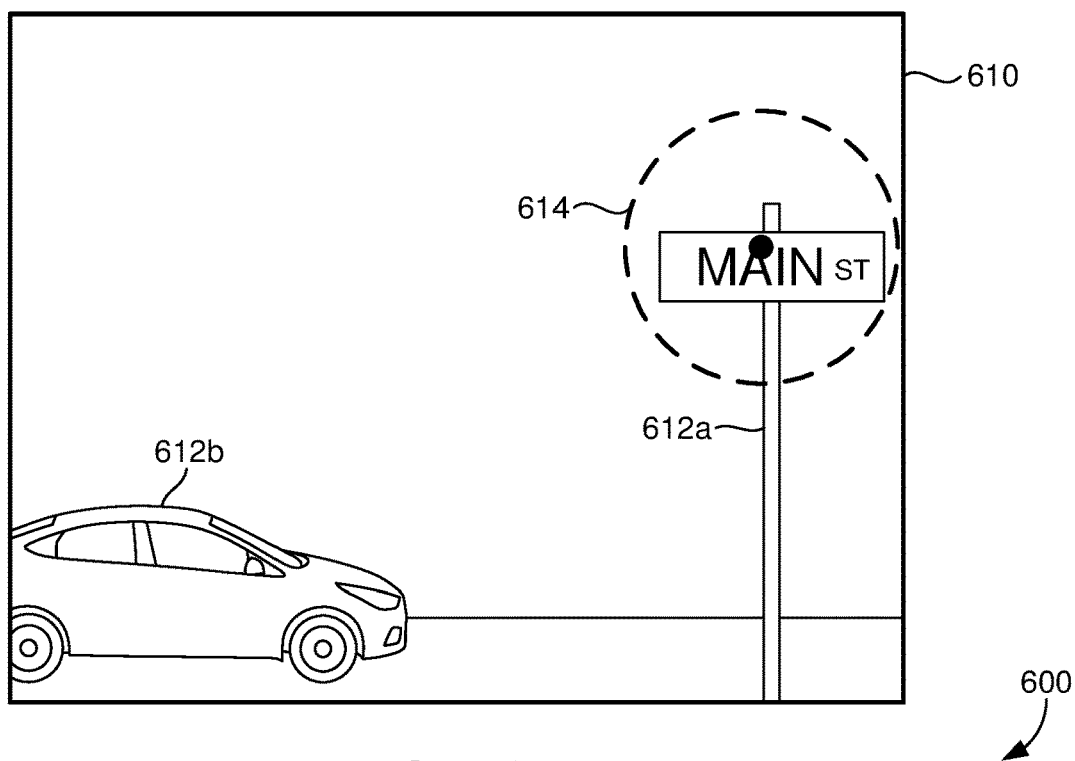
FIG. 6A-6B depict a variety of illustrations showing even further exemplary implementations for dynamically modifying virtual environments utilizing eye-tracking, in accordance with some embodiments of the present disclosure.
Figure 6B:
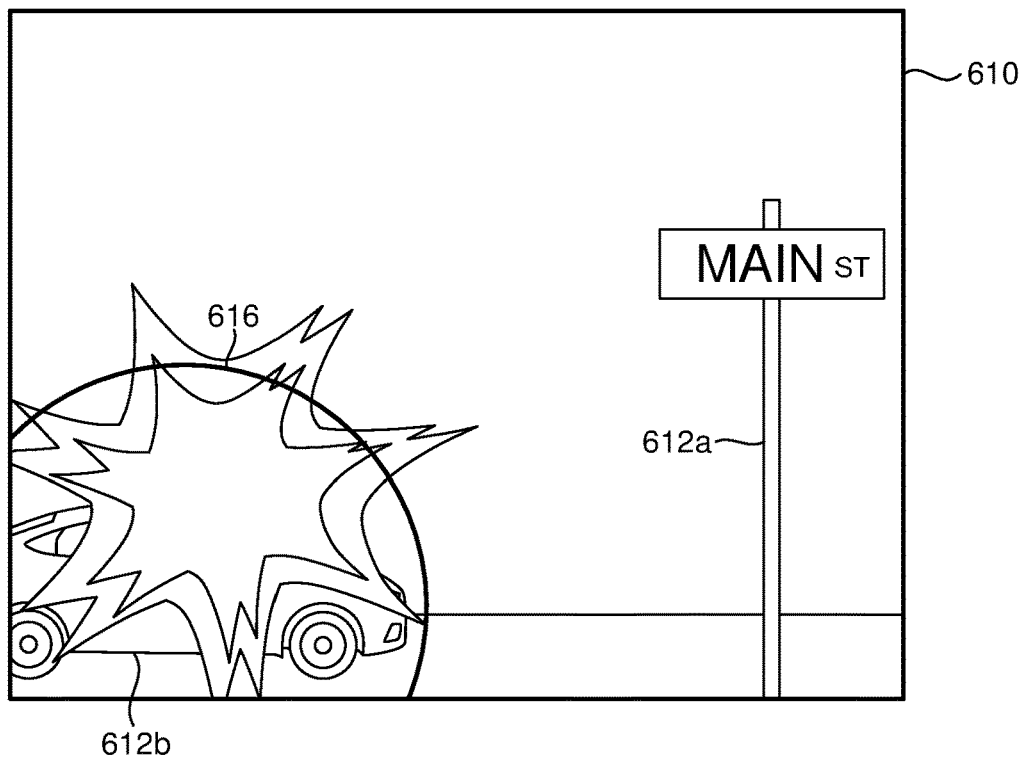

Looking now to FIGS. 6A-B, a set of illustrations 600 is provided to depict exemplary implementations of modifying a virtual scene using eye-tracking data, in accordance with some embodiments of the present disclosure. A virtual scene 610 can be provided for display on an HMD (e.g. HMD 110 of FIG. 1) for a user to interact with. The virtual scene 610 can include any number of virtual objects, for example virtual objects 612a and 612b. As a user interacts with virtual scene 610, e.g. the user views the virtual scene 610, sensor data can be received from a set of eye-tracking sensors (e.g. sensors 120 of FIG. 1) and a set of focal regions 614 can be determined. In this exemplary implementation, based on the set of focal regions 614, it can be determined, for example, that the user is attending to virtual object 612a. Accordingly, a portion of the virtual scene 610 can be modified or changed based on the determined focal regions 614, for example an effect 616 (e.g. low fidelity effect) can be applied to a portion of the virtual scene 610 outside of the set of focal regions 614, for example an effect 616 can be applied to virtual object 612b, such that when a user shifts their gaze to virtual object 612b they can see the result of the effect 616.

Figure 7A:
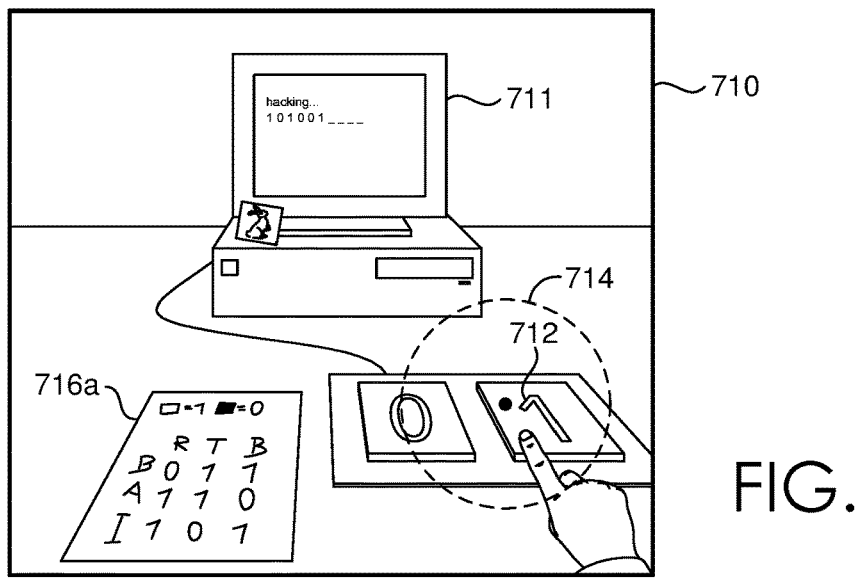
FIG. 7A-7C depict a variety of illustrations showing even further exemplary implementations for dynamically modifying virtual environments utilizing eye-tracking, in accordance with some embodiments of the present disclosure.
Figure 7B:
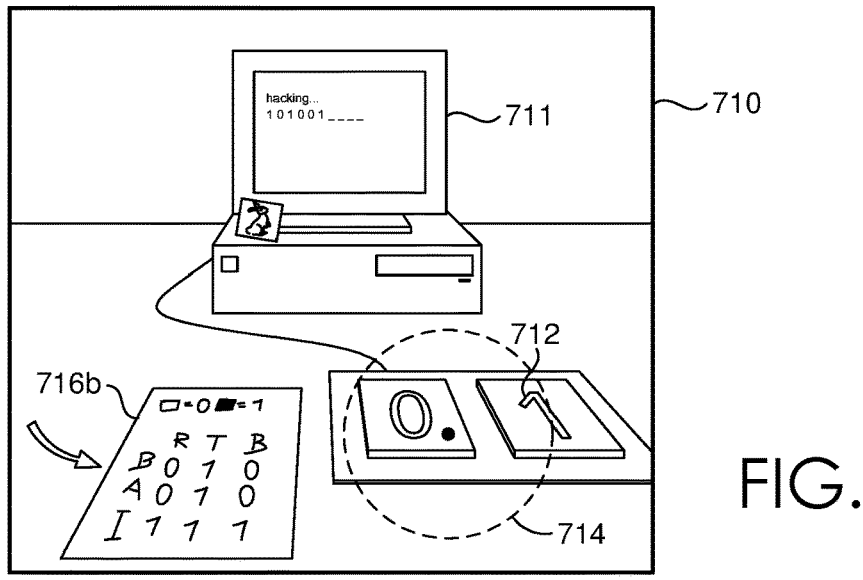
Figure 7C:
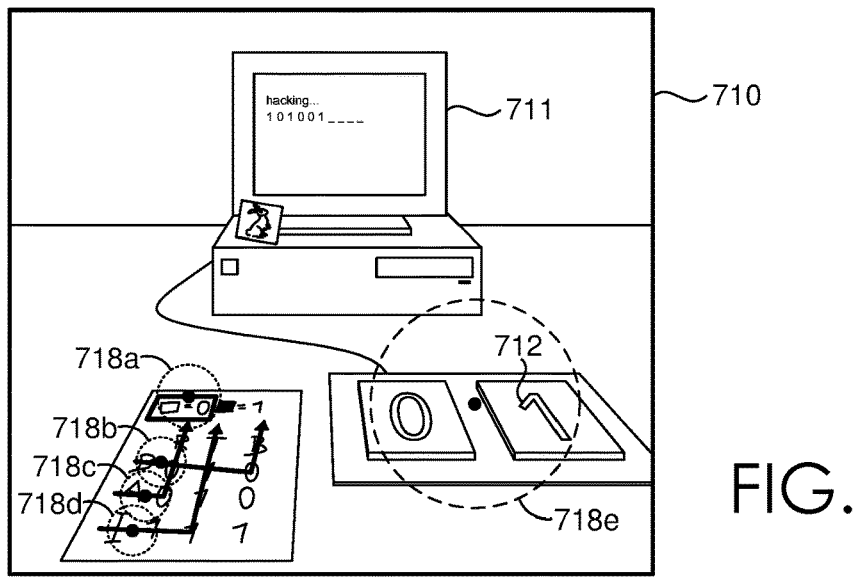

Looking now to FIGS. 7A-C, a set of illustrations 700 is provided to depict exemplary implementations of modifying a virtual scene using eye-tracking data, in accordance with some embodiments of the present disclosure. A virtual scene 710 can be provided for display on an HMD (e.g. HMD 110 of FIG. 1) for a user to interact with. Virtual scene 710 can include any number of virtual objects (e.g. 711, 712, and 716a) that a user can view and/or otherwise interact with. In some instances, a user can be presented with one or more tasks to complete (e.g. via interaction with virtual object 712) that requires the user to understand one or more features of the virtual scene 710. For example, based on sensor data on sensor data received from a set of eye-tracking sensors (e.g. eye-tracking sensors 120 of FIG. 1) a set of focal regions 714 of the displayed virtual scene 710 can be determined as the user attempts to complete the one or more tasks without understanding one or more features of the virtual scene 710. As the user did not understand the virtual scene 710 (e.g. the features of virtual object 716a) as they were completing the task, one or more virtual objects (e.g. 716a, 711) can be modified or changed outside of the determined set of focal regions 714, for example virtual object 716a of FIG. 7A can be modified to 716b of FIG. 7B. For example, based on sensor data on sensor data received from a set of eye-tracking sensors (e.g. eye-tracking sensors 120 of FIG. 1) a plurality of different sets of focal regions 718a, 718b, 718c, 718d, 718e of the displayed virtual scene 710 can be determined as the user attempts to complete the one or more tasks. From the plurality of different sets of focal regions 718a, 718b, 718c, 718d, 718e, one or more gaze patterns or scan paths can be defined (e.g. by change activation component 250) and compared against one or more known or otherwise predefined gaze patterns or scan paths to determine a measure of user understanding with respect to the virtual scene 710.

Figure 8A:
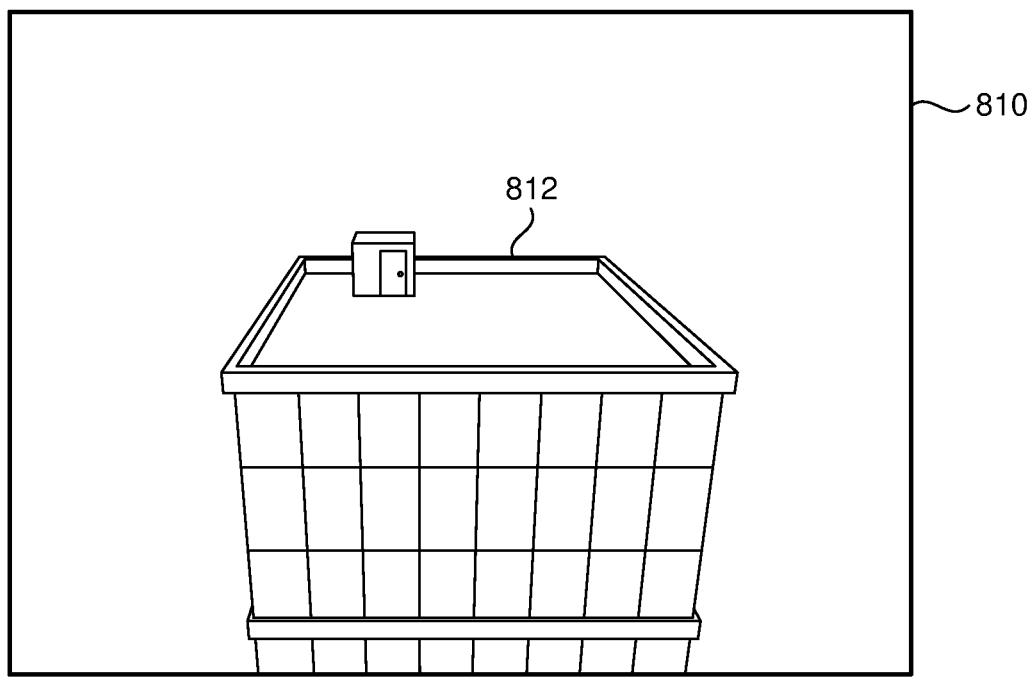
FIG. 8A-8B depict a variety of illustrations showing even further exemplary implementations for dynamically modifying virtual environments utilizing eye-tracking, in accordance with some embodiments of the present disclosure.
Figure 8B:
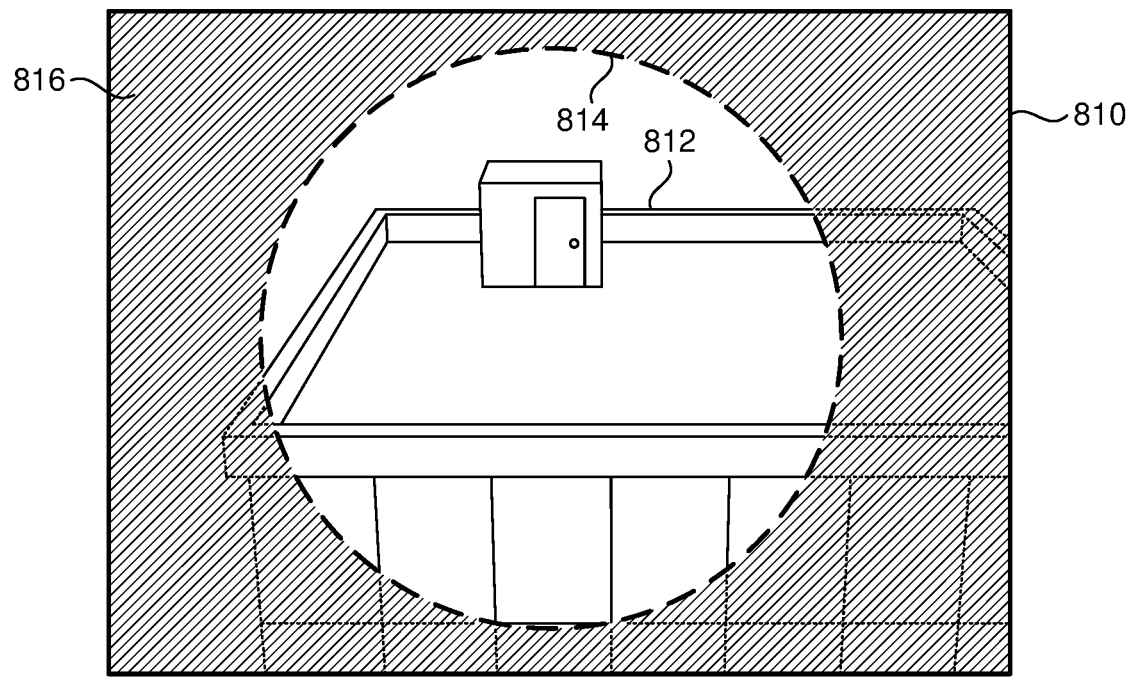

Looking now to FIGS. 8A-B, a set of illustrations 800 is provided to depict exemplary implementations of modifying a virtual scene using eye-tracking data, in accordance with some embodiments of the present disclosure. A virtual scene 810 can be provided for display on an HMD (e.g. HMD 110 of FIG. 1) for a user to interact with. In some embodiments a user can interact with a virtual scene through virtual locomotion, for example a user can jump from one location (e.g. a present location) in a virtual scene 810 to another location 812 in the virtual scene 810. Accordingly, based on sensor data received from a set of eye-tracking sensors (e.g. eye-tracking sensors 120 of FIG. 1) a set of focal regions 814 of the displayed virtual scene 810 can be determined as the user "moves" through the virtual scene 810. Once the set of focal regions 814 are determined, one or more modifications or changes can be made to a portion 816 of the virtual scene 810 where the portion 816 is outside of the determined focal regions 814. In some embodiments, the modification or change can include reducing the frame rate corresponding to the portion of the virtual scene 810 outside of the focal regions 814, for example by blending static images.

Figure 9:
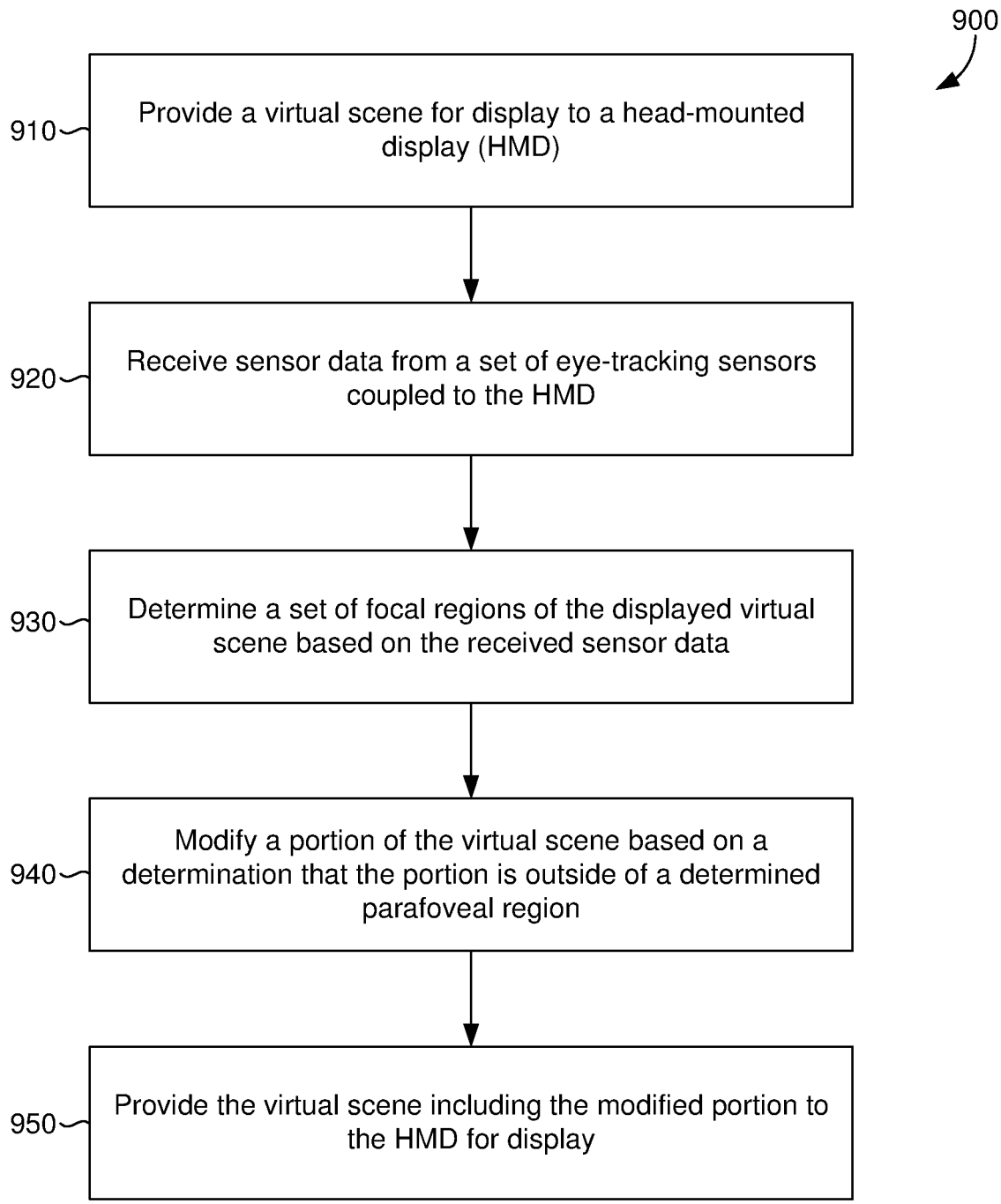
FIG. 9 is a flow chart depicting an exemplary process flow for dynamically modifying virtual environments utilizing eye-tracking, in accordance with some embodiments of the present disclosure.

Having described various aspects of the present disclosure, exemplary methods are described below for dynamically modifying a virtual scene, in accordance with some embodiments. Referring to FIG. 9 a flow diagram is provided depicting a method 900 for dynamically modifying virtual environments, or a virtual scene, utilizing eye-tracking. Each block of method 900 and other methods described herein comprises a computing process that may be performed using any combination of hardware, firmware, and/or software. For instance, various functions may be carried out by a module, hardware device, or processor executing instructions stored in memory. Various portions of the methods may also be embodied as computer-usable instructions stored on computer storage media. In various embodiments, a head-mounted display (HMD) (e.g., HMD 110 of FIG. 1) is coupled to a computing device.

In some embodiments, the HMD can be coupled to a set of eye-tracking sensors, such as sensor(s) 120 of FIG. 1. Initially, at block 910, the computing device can provide a virtual scene to an HMD for display. At block 920, the computing device can receive sensor data (e.g. eye-tracking data) from a set of eye-tracking sensors coupled to the HMD (e.g. sensor(s) 120 of FIGS. 1 and 2). At block 930, the computing device can determine a set of focal regions of the displayed virtual scene based on the received sensor data (e.g. by attention tracking component 240 of FIG. 2). In some embodiments, the set of focal regions includes a foveal region, a parafoveal region, and/or a perifoveal region of a displayed virtual scene. In some embodiments gaze point to can be utilized to determine the current attention of a user. In some embodiments this is accomplished through determining focal regions of a displayed virtual scene based on eye-tracking data associated with a user. It will be appreciated that changes or modification to virtual objects that appear outside of a determined foveal, parafoveal, and/or perifoveal region of the displayed virtual scene are less likely to be detected, and as such gaze point can be leveraged to make changes or modification to the virtual scene. In this instance, the computing device can compute the convex hull of a virtual object's mesh data points with respect to the view plane. If the angular distance between the computed convex hull and the measured or determined gaze point (e.g. based on the set of focal regions) falls below a threshold value, the virtual object is considered by the computing device to be in the user's focus (e.g. the user is looking at the virtual object within the virtual scene). In some further embodiments gaze dwell times on various objects in the virtual scene can be utilized to determine attention with respect to a virtual scene. In this way, for example, spatial memory can be considered with respect to a user's attention when changing or modifying a virtual scene, thus a user may be prevented from using visual recall to notice a change or modification of the virtual scene. The computing device can determine one or more different sets of focal regions of a displayed virtual scene based on different sensor data received from the set of eye-tracking sensors. The different sets of focal regions can include corresponding different foveal, parafoveal, and/or perifoveal regions of the displayed virtual scene. Further, the computing device can calculate a weight associated with various portions or virtual objects of the virtual scene, for instance a calculated weight can be based on determined time durations between the determined set of focal regions and the one or more different sets of focal regions. Based on the calculated weight a portion of the virtual scene can be modified or changed. In some embodiments, a weighted directed graph can be implemented to process gaze dwell times.

In some further embodiments, pupilometry as it relates to cognitive load can be utilized to process attention with respect to a virtual scene. The computing device can determine a pupilometry based on, for example, a detected pupil diameter included in received sensor data from the set of eye-tracking sensors. From the pupilometry, a cognitive load value can be determined and the virtual scene can be changed or modified based on the cognitive load value. In some embodiments, an index of pupillary activity can be implemented as a measure of cognitive load. Accordingly, a pupil dilation's correlation with detection rate of changes to a virtual scene can be utilized to predict a user's attention. In some instances, pupil dilation can be measured over varying illumination levels of a viewing plane to determine a baseline. From on this baseline, an assumed pupil diameter can be derived over which fast wavelet transforms can be run to count local peaks of that value, which can be normalized.

In some embodiments, saccades are utilized in processing user attention with respect to a virtual scene. For instance saccades may be used to approximate visual saliency. The computing device can determine a number of saccades over a defined period of time based on the received sensor data, and change or modify a virtual scene based on a determination that the number of saccades for a given time frame is below a threshold value. In some instances, modifications or changes to a virtual scene can be made at a time between a measured saccade and a given time after it, as this assumes a user would not focus on objects outside of the determined focal region during this time frame. In some other instances, covert attention can be prevented by implementing a task requiring a user's visual attention.

In some further embodiments, measured user intent and/or measured user understanding as they relate to a virtual scene can be taken into account to modify or make changes to a virtual scene. In one embodiment, user intent can be measured by capturing and threshold dwell times on objects or sets of objects. The computing device can determine a time duration associated with a determined foveal region as compared to a different portion of a displayed virtual scene. The virtual scene can be changed or modified based on a comparison of the determined duration to a defined dwell threshold duration. In another embodiment, user understanding can be measured by using a probabilistic comparison of a user's gaze pattern to an intended gaze pattern associated with a virtual scene. Based on received sensor data the computing device can determine a plurality of different sets of focal regions of the displayed virtual scene, the plurality of different sets of focal regions defining a gaze pattern. The computing device can change or modify the virtual scene based on a determination that the defined gaze pattern corresponds to at least one predetermined or known gaze pattern. In some further embodiments, the computing device can utilize additional masking techniques when changing or modifying a virtual scene, for example by modifying a virtual scene based on another modification to the virtual scene, such as the insertion of a virtual object into the virtual scene that is positioned at a distance away from the portion to be modified. Additionally, other modifications can be made to the virtual scene that is a threshold distance away from the portion to be modified, for example creating distractions, or reducing frame rates in portions of the virtual scene, which can mask out peripheral motion, i.e. obfuscates portions of a virtual scene outside of a foveal region. The other modification can additionally comprise the insertion of a virtual object into the virtual scene positioned at least a defined threshold distance away from the portion, or a modification of another portion of the virtual scene positioned at least the defined threshold distance away from the portion.

At step 940, the computing device can modify a portion of the virtual scene (e.g. by scene modifying component 260 of FIG. 2) based on a determination that the portion is outside at least one of the determined foveal, parafoveal, and/or perifoveal region (e.g. by attention tracking component 240 of FIG. 2). In some embodiments, the portion of the virtual scene is modified based further in part on a probability that the modification is detected, the probability being calculated based at least in part on the determined set of focal regions. In some embodiments, the virtual scene can be modified based on a duration associated with the foveal region and a different portion of the displayed virtual scene. In this instance the portion of the virtual scene is modified based further on a comparison of a determined duration to a defined dwell threshold duration. In other embodiments, the virtual scene can be modified based on gaze patterns. In this instance, a plurality of different sets of focal regions of the displayed virtual scene based on received sensor data can be determined. The plurality of different sets of focal regions can define a gaze pattern, and a portion of the virtual scene is modified based further in part on a determination that the defined gaze pattern corresponds to one of a set of known gaze patterns. At block 950, the computing device can provide the virtual scene, including the modified portion, to the HMD for display.

Figure 10:
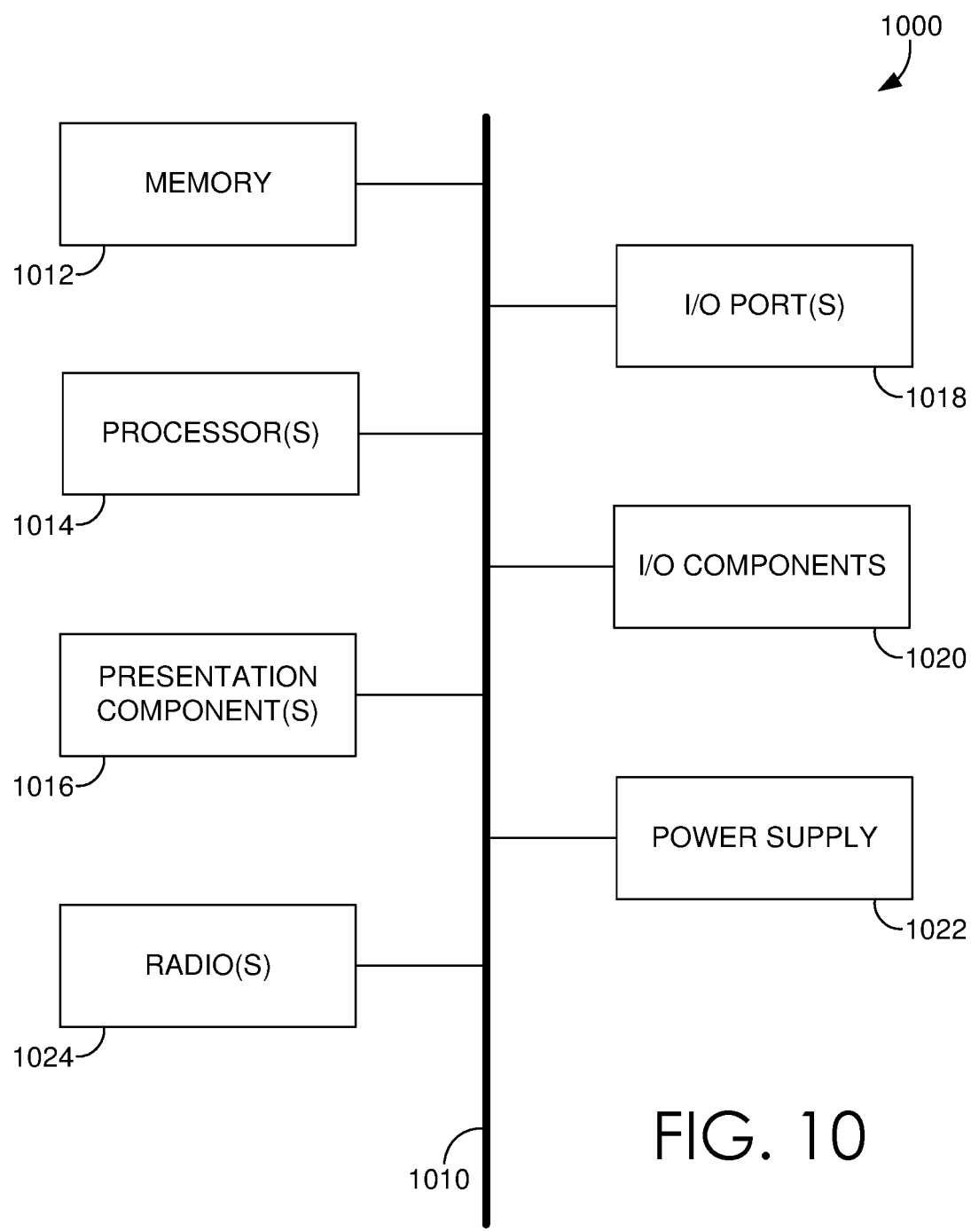
FIG. 10 is a block diagram of an exemplary computing environment suitable for use in accordance with some embodiments of the present disclosure.

With reference now to FIG. 10, computing device 1000 includes a bus 1010 that directly or indirectly couples the following devices: memory 1012, one or more processors 1014, one or more presentation components 1016, input/output ports 1018, input/output components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of the detailed discussion above, embodiments of the present invention are described with reference to a head-mounted display unit comprising or coupled to a virtualizing computing device; however, the head-mounted display unit depicted herein is merely exemplary. Components can be configured for performing novel aspects of embodiments, where configured for comprises programmed to perform particular tasks or implement particular abstract data types using code. Further, while embodiments of the present invention may generally refer to the head-mounted display unit and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for dynamically modifying a virtual scene, the method comprising:
    providing for display, by a computing device, the virtual scene to a head-mounted display (HMD) coupled to the computing device;
    receiving, by the computing device, sensor data from a set of eye-tracking sensors coupled to the HMD;
    determining, by the computing device, a set of focal regions of the displayed virtual scene based on the received sensor data, wherein the determined set of focal regions includes a perifoveal region of the displayed virtual scene;
    modifying, by the computing device, a portion of the virtual scene based at least in part on a determination that the portion is radially outside of the determined perifoveal region; and
    providing for display, by the computing device, the virtual scene including the modified portion to the HMD.

2. The computer-implemented method of claim 1, further comprising:
    determining, by the computing device, a pupilometry based on at least one detected pupil diameter included in the received sensor data; and
    determining, by the computing device, a cognitive load value based at least in part on the determined pupilometry, wherein the portion of the virtual scene is modified based further in part on the determined cognitive load value.

3. The computer-implemented method of claim 1, further comprising:
    determining, by the computing device, a number of saccades over a defined period of time based on the received sensor data, and wherein the portion of the virtual scene is modified based further in part on a determination that the number of saccades is below a threshold value.

4. The computer-implemented method of claim 1, further comprising:
    determining, by the computing device, a different set of focal regions of the displayed virtual scene based on the received sensor data, wherein the different set of focal regions includes a different perifoveal region of the displayed virtual scene; and
    detecting, by the computing device, a change from the determined different set of focal regions to the determined set of focal regions, wherein the portion of the virtual scene is modified within a defined period of time after the detected change.

5. The computer-implemented method of claim 1, further comprising:
    determining, by the computing device, a different set of focal regions of the displayed virtual scene based on different sensor data received from the set of eye-tracking sensors, wherein the determined set of focal regions further includes a foveal region of the displayed virtual scene and the determined different set of focal regions includes a different foveal region corresponding to the portion and a different perifoveal region of the displayed virtual scene; and
    calculating, by the computing device, a weight associated with the portion based on a determined duration between a first time that the different set of focal regions is determined and a second time that the set of focal regions is determined, wherein the portion of the virtual scene is modified based further in part on the calculated weight.

6. The computer-implemented method of claim 1, wherein the portion of the virtual scene is modified based further in part on a probability that the modification is detected, the probability being calculated based at least in part on the determined set of focal regions.

7. The computer-implemented method of claim 1, further comprising:
    determining, by the computing device, a duration associated with the foveal region and a different portion of the displayed virtual scene, wherein the portion of the virtual scene is modified based further on a comparison of the determined duration to a defined dwell threshold duration.

8. The computer-implemented method of claim 1, further comprising:
    determining, by the computing device, a plurality of different sets of focal regions of the displayed virtual scene based on the received sensor data, wherein the determined plurality of different sets of focal regions defines a gaze pattern, wherein the portion of the virtual scene is modified based further in part on a determination that the defined gaze pattern corresponds to one of a set of known gaze patterns.

9. The computer-implemented method of claim 1, wherein the portion of the virtual scene is modified based further in part on another modification to the virtual scene, the other modification comprising one of an insertion of a virtual object into the virtual scene positioned at least a defined threshold distance away from the portion, or a modification of another portion of the virtual scene positioned at least the defined threshold distance away from the portion.

10. A non-transitory computer storage medium storing computer-useable instructions that, when used by one or more computing devices, cause the one or more computing devices to perform operations comprising:
  providing for display a virtual scene to a HMD coupled to the computing device;
  receiving sensor data from a set of eye-tracking sensors coupled to the HMD, the sensor data corresponding to at least one of eye position and eye movement of a user;
  determining a set of focal regions within the displayed virtual scene based on the received sensor data, wherein the determined set of focal regions includes a foveal region of the displayed virtual scene and a perifoveal region of the displayed virtual scene;
    modifying a portion of the virtual scene based on a determination that the portion is radially outside of the determined perifoveal region; and
  providing for display the virtual scene including the modified portion to the HMD.

11. The medium of claim 10, further comprising:
determining a different set of focal regions of the displayed virtual scene based on different sensor data received from the set of eye-tracking sensors, wherein the determined set of focal regions further includes a foveal region of the displayed virtual scene and the determined different set of focal regions includes a different foveal region corresponding to the portion and a different perifoveal region of the displayed virtual scene; and
calculating a weight associated with the portion based on a determined duration between a first time the different set of focal regions is determined and a second time the set of focal regions is determined, wherein the portion of the virtual scene is modified based further in part on the calculated weight.

12. The medium of claim 10, further comprising:
determining a pupilometry based on at least one detected pupil diameter included in the received sensor data; and
determining a cognitive load value based at least in part on the determined pupilometry, wherein the portion of the virtual scene is modified based further in part on the determined cognitive load value.

13. The medium of claim 10, further comprising:
determining a number of saccades over a defined period of time based on the received sensor data, and wherein the portion of the virtual scene is modified based further in part on a determination that the number of saccades is below a threshold value.

14. The medium of claim 10, further comprising:
determining a different set of focal regions of the displayed virtual scene based on the received sensor data, wherein the different set of focal regions includes a different perifoveal region of the displayed virtual scene; and
detecting a change from the determined different set of focal regions to the determined set of focal regions, wherein the portion of the virtual scene is modified within a defined period of time after the detected change.

15. The medium of claim 10, further comprising:
determining a probability of detection associated with the modification, the probability based in part on the determined set of focal regions, wherein the portion of the virtual scene is modified based on the probability of detection compared to a threshold detection value.

16. The medium of claim 10, further comprising:
determining a duration associated with the foveal region and a gaze pattern associated with a plurality of determined foveal regions, wherein the portion of the virtual scene is modified based on a comparison of the determined duration to a defined dwell threshold duration and a comparison of the gaze pattern to one of a set of known gaze patterns.

17. A computerized system comprising:
an eye-tracking means for determining a set of focal regions of a virtual scene displayed on a head-mounted device (HMD) based on received sensor data from a set of eye-tracking sensors coupled to the HMD, the determined set of focal regions including at least a perifoveal region; and
a virtual scene modifying means for modifying a portion of the virtual scene based on a determination that the portion is radially outside of the determined perifoveal region.

18. The system of claim 17, further comprising:
an attention tracking means for determining that the portion can be modified based on one or more of a relative position of the portion to the perifoveal region, a weight calculated for the portion, a determined pupilometry, a detected number of saccades, a determined duration after one or more of the saccades.

19. The system of claim 17 further comprising:
a change activating means for initiating the modification based on one or more of a random trigger, a determination that a foveal region included in the determined set of focal regions corresponds to a particular virtual object within the virtual scene, or a scan path determined to correspond to a set of predefined scan paths.

20. The system of claim 17 further comprising:
a user intent and understanding means for determining a duration associated with the foveal region and a gaze pattern associated with a plurality of determined foveal regions, wherein the portion of the virtual scene is modified based on a comparison of the determined duration to a defined dwell threshold duration and a comparison of the gaze pattern to one of a set of known gaze patterns.

* * * * *